United States Patent
Wei

(10) Patent No.: US 11,330,178 B2
(45) Date of Patent: May 10, 2022

(54) MODE SELECTION ASSEMBLY AND METHOD FOR SELECTING IMAGING MODE

(71) Applicant: SZ DJI TECHNOLOGY CO., LTD., Shenzhen (CN)

(72) Inventor: Jidong Wei, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/165,766

(22) Filed: Feb. 2, 2021

(65) Prior Publication Data
US 2021/0160427 A1 May 27, 2021

Related U.S. Application Data

(63) Continuation of application No. 16/104,645, filed on Aug. 17, 2018, now Pat. No. 10,917,570, which is a continuation of application No. PCT/CN2016/073948, filed on Feb. 17, 2016.

(51) Int. Cl.
*H04N 5/225* (2006.01)
*H04N 5/232* (2006.01)
*G03B 17/14* (2021.01)

(52) U.S. Cl.
CPC ....... *H04N 5/23245* (2013.01); *H04N 5/2252* (2013.01); *G03B 17/14* (2013.01); *G03B 2217/002* (2013.01)

(58) Field of Classification Search
CPC .............. H04N 5/2251–2254; H04N 5/23245
USPC ........................................................ 348/373
See application file for complete search history.

(56) References Cited

U.S. PATENT DOCUMENTS

| 5,719,712 A | 2/1998 | Ishikawa |
| 5,969,889 A | 10/1999 | Iikawa et al. |
| 2012/0327290 A1 | 12/2012 | Matsuzawa et al. |
| 2013/0335589 A1 | 12/2013 | Yuge et al. |
| 2015/0234147 A1 | 8/2015 | Nagano |
| 2016/0320588 A1 | 11/2016 | Kindaichi et al. |
| 2017/0199347 A1 | 7/2017 | Takeshita et al. |

(Continued)

FOREIGN PATENT DOCUMENTS

| CN | 1175706 A | 3/1998 |
| CN | 1485636 A | 3/2004 |
| CN | 1495507 A | 5/2004 |

(Continued)

OTHER PUBLICATIONS

The World Intellectual Property Organization (WIPO) International Search Report and Written Opinion for PCT/CN2016/073948 dated Oct. 28, 2016 8 pages.

*Primary Examiner* — Anthony J Daniels
(74) *Attorney, Agent, or Firm* — Anova Law Group, PLLC

(57) ABSTRACT

A mode selection assembly includes a gear ring coupled to a lens barrel of an imaging device having two or more gear positions, a selecting ring coupled to the lens barrel, and two or more photoelectric sensors. The gear ring is configured to be a sleeve of the lens barrel. The selecting ring is configured to adjust an imaging mode of the imaging device by turning the selecting ring. The selecting ring includes a first circular section having a plurality of recesses configured to engage with a first number of bulges of the gear ring. The two or more photoelectric sensors are attached to the first circular ring.

18 Claims, 24 Drawing Sheets

(56) References Cited

U.S. PATENT DOCUMENTS

2017/0235090 A1* 8/2017 Takeshita ......... H04N 5/232123
　　　　　　　　　　　　　　　　　　　　　348/345

FOREIGN PATENT DOCUMENTS

| | | |
|---|---|---|
| CN | 1952715 A | 4/2007 |
| CN | 102196169 A | 9/2011 |
| CN | 102450852 A | 5/2012 |
| CN | 102841485 A | 12/2012 |
| CN | 102842485 A | 12/2012 |
| CN | 102998879 A | 3/2013 |
| CN | 104412157 A | 3/2015 |
| JP | 0455835 A | 2/1992 |
| JP | 2015038571 A | 2/2015 |
| WO | 2014013957 A1 | 1/2014 |
| WO | 2017047593 A1 | 3/2017 |

\* cited by examiner

MODE SELECTION ASSEMBLY AND METHOD FOR SELECTING IMAGING MODE

CROSS-REFERENCE TO RELATED APPLICATION

This application is a continuation of U.S. application Ser. No. 16/104,645, filed on Aug. 17, 2018, which is a continuation of International Application No. PCT/CN2016/073948, filed on Feb. 17, 2016, the entire contents of all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to imaging devices and more particularly, but not exclusively, to supporting operation of an imaging device.

BACKGROUND OF THE DISCLOSURE

Traditionally-available imaging devices, especially sports cameras, have various imaging modes designed to achieve optimized imaging effects under different settings.

However, manipulations of the traditionally-available imaging devices are complicated and not enjoyable when users select from among the imaging modes.

In view of the foregoing reasons, there is a need for a mode selection assembly for facilitating selection among the imaging modes of an imaging device.

SUMMARY OF THE DISCLOSURE

In accordance with a first aspect disclosed herein, there is set forth a mode selection assembly for selecting an imaging mode from among a plurality of imaging modes of an imaging device, comprising:

a selecting ring coupled to a lens barrel of the imaging device, wherein the imaging mode of the imaging device is selected by turning the selecting ring being attached with a contact switch.

In an exemplary embodiment of the disclosed mode selection assemblies, the mode selection assembly is a lens collar associated with the lens barrel of the imaging device.

Exemplary embodiments of the disclosed mode selection assemblies further comprise a gear ring being coupled with the lens barrel or a housing of the imaging device.

In an exemplary embodiment of the disclosed mode selection assemblies, the selecting ring engages with the gear ring to form a plurality of gear positions.

In another exemplary embodiment of the disclosed mode selection assemblies, a chosen gear position corresponds to a selected imaging mode selected from the plurality of imaging modes.

In another exemplary embodiment of the disclosed mode selection assemblies, the selecting ring operates to engage the contact switch.

In another exemplary embodiment of the disclosed mode selection assemblies, at least one of the gear positions can be chosen by turning the selecting ring.

In another exemplary embodiment of the disclosed mode selection assemblies, the selected imaging mode is selected when the selecting ring is turned to the chosen gear position.

Exemplary embodiments of the disclosed mode selection assemblies further comprise two or more bulges extending from the gear ring for engaging the selecting ring.

In another exemplary embodiment of the disclosed mode selection assemblies, the selecting ring defines two or more recesses for engaging the bulges of the gear ring.

In another exemplary embodiment of the disclosed mode selection assemblies, a first number of the recesses is greater than a second number of the bulges.

In another exemplary embodiment of the disclosed mode selection assemblies, the first number is at least three times the second number.

Exemplary embodiments of the disclosed mode selection assemblies further comprise a lens ring being coupled with the housing of the imaging device and having a plurality of contact pairs.

In another exemplary embodiment of the disclosed mode selection assemblies, each of the contact pairs corresponds to one of the plurality of imaging modes.

In another exemplary embodiment of the disclosed mode selection assemblies, each of the contact pairs can be connected to trigger a mode selecting pulse.

Exemplary embodiments of the disclosed mode selection assemblies further comprise a flexible flat cable ("FFC") for transmitting the mode selecting pulse.

In another exemplary embodiment of the disclosed mode selection assemblies, the FFC comprises a plurality of wires each being connected to a contact of the contact pairs allocated on the lens ring.

Exemplary embodiments of the disclosed mode selection assemblies further comprise the contact switch associated with the selecting ring for connecting a chosen contact pair.

In another exemplary embodiment of the disclosed mode selection assemblies, the contact switch includes at least two fingers for connecting the chosen contact pair, the two fingers being conductively connected.

In another exemplary embodiment of the disclosed mode selection assemblies, the contact switch is attached with the selecting ring via a switch mounting base being mounted to the selecting ring.

Exemplary embodiments of the disclosed mode selection assemblies further comprise a plurality of selecting ring mounting brackets attached to the gear ring for engaging the selecting ring with the gear ring.

Exemplary embodiments of the disclosed mode selection assemblies further comprise a front cover for sealing the imaging device or the lens.

In another exemplary embodiment of the disclosed mode selection assemblies, the front cover is associated with the gear ring.

In accordance with another aspect disclosed herein, there is set forth an imaging device for selecting an imaging mode from among a plurality of imaging modes, comprising:

a body;

a lens barrel coupled to the body; and a mode selection assembly provided in accordance with any one of previous embodiments of the disclosed mode selection assemblies, being coupled to the lens barrel for selecting the imaging mode.

In an exemplary embodiment of the disclosed imaging device, the imaging device is a compact imaging device.

In another exemplary embodiment of the disclosed imaging devices, an outer diameter of the mode selection assembly is between one centimeter and ten centimeters, inclusive.

In another exemplary embodiment of the disclosed imaging devices, an inner diameter of the mode selection assembly is between one tenth of a centimeter and ten centimeters, inclusive.

In another exemplary embodiment of the disclosed imaging devices, the imaging device can be in a shape selected from a group consisting of a cubic, a cuboid, a sphere, a cylinder or a prism.

In another exemplary embodiment of the disclosed imaging devices, a front scale of the imaging device is between one centimeter and ten centimeters, inclusive.

In another exemplary embodiment of the disclosed imaging devices, the front scale comprises at least one of a width, a height, a diameter and a diagonal.

In another exemplary embodiment of the disclosed imaging devices, a thickness of the imaging device is between one tenth of a centimeter and five centimeters, inclusive.

In accordance with another aspect disclosed herein, there is set forth a method for manufacturing an imaging device, comprising:

attaching a selecting ring to a lens barrel of the imaging device; and enabling the selecting ring to select an imaging mode from among a plurality of imaging modes of the imaging device by turning the selecting ring.

Exemplary embodiments of the disclosed methods further comprise coupling a gear ring to the lens barrel or a housing of the imaging device.

Exemplary embodiments of the disclosed methods further comprise engaging the selecting ring with the gear ring to form a plurality of gear positions.

Exemplary embodiments of the disclosed methods further comprise corresponding at least one of the gear positions to a selected imaging mode selected from the plurality of imaging modes.

In an exemplary embodiment of the disclosed methods, enabling the selecting ring comprises attaching a contact switch to the selecting ring.

In another exemplary embodiment of the disclosed methods, enabling the selecting ring comprises corresponding the imaging mode to the chosen gear position.

Exemplary embodiments of the disclosed methods further comprise providing two or more bulges extending from the gear ring for engaging the selecting ring.

In another exemplary embodiment of the disclosed methods, enabling the selecting ring comprises defining two or more recesses on the selecting ring for engaging the bulges of the gear ring.

In another exemplary embodiment of the disclosed methods, a first number of the recesses is greater than a second number of the bulges.

In another exemplary embodiment of the disclosed methods, the first number is at least three times the second number.

Exemplary embodiments of the disclosed methods further comprise coupling a lens ring to a housing of the imaging device for allocating a plurality of contact pairs.

In another exemplary embodiment of the disclosed methods, coupling the lens ring comprises providing the plurality of contact pairs, wherein each of the contact pairs corresponds to one of the imaging modes.

In another exemplary embodiment of the disclosed methods, enabling the selecting ring comprises connecting the contact pair to trigger a mode selecting pulse.

Exemplary embodiments of the disclosed methods further comprise providing a flexible flat cable ("FFC") for transmitting the mode selecting pulse.

In another exemplary embodiment of the disclosed methods, providing the FFC comprises providing a plurality of wires each being connected to a contact of the contact pairs allocated on the lens ring.

Exemplary embodiments of the disclosed methods further comprise providing the contact switch associated with the selecting ring for connecting a chosen contact pair.

In another exemplary embodiment of the disclosed methods, providing a contact switch comprises providing at least two fingers for connecting the chosen contact pair, the two fingers being conductively connected.

In another exemplary embodiment of the disclosed methods, providing a contact switch comprises attaching the contact switch with the selecting ring via a switch mounting base being mounted to the selecting ring.

Exemplary embodiments of the disclosed methods further comprise attaching a plurality of selecting ring mounting brackets to the gear ring for engaging the selecting ring with the gear ring.

Exemplary embodiments of the disclosed methods further comprise providing a front cover, attached to the housing of the imaging device and/or the lens barrel, for sealing the imaging device and/or the lens.

In another exemplary embodiment of the disclosed methods, providing the front cover comprises associating the gear ring with the front cover.

In another exemplary embodiment of the disclosed methods, engaging the selecting ring with the gear ring comprises engaging the selecting ring via the selecting ring mounting brackets.

In accordance with another aspect disclosed herein, there is set forth a mode selection assembly for selecting an imaging mode from among a plurality of imaging modes of an imaging device, comprising:

a selecting ring coupled to a lens barrel of the imaging device, wherein the imaging mode of the imaging device is selected by turning the selecting ring to expose a first photoelectric sensor and/or a second photoelectric sensor.

In an exemplary embodiment of the disclosed mode selection assemblies, the mode selection assembly is a lens collar associated with the lens barrel of the imaging device.

Exemplary embodiments of the disclosed mode selection assemblies further comprise a gear ring being coupled with the lens barrel or a housing of the imaging device.

In an exemplary embodiment of the disclosed mode selection assemblies, the selecting ring engages with the gear ring to form a plurality of gear positions.

In another exemplary embodiment of the disclosed mode selection assemblies, a chosen gear position corresponds to a selected imaging mode selected from the plurality of imaging modes.

In another exemplary embodiment of the disclosed mode selection assemblies, the selecting ring operates to expose the first photoelectric sensor and/or the second photoelectric sensor.

In another exemplary embodiment of the disclosed mode selection assemblies, at least one of the gear positions can be chosen by turning the selecting ring.

In another exemplary embodiment of the disclosed mode selection assemblies, the selected imaging mode is selected when the selecting ring is turned to the chosen gear position.

Exemplary embodiments of the disclosed mode selection assemblies further comprise two or more bulges extending from the gear ring for engaging the selecting ring.

In another exemplary embodiment of the disclosed mode selection assemblies, the selecting ring defines two or more recesses for engaging the bulges of the gear ring.

In another exemplary embodiment of the disclosed mode selection assemblies, a first number of the recesses is greater than a second number of the bulges.

In another exemplary embodiment of the disclosed mode selection assemblies, the first number is at least three times the second number.

Exemplary embodiments of the disclosed mode selection assemblies further comprise a lens ring being coupled with the housing of the imaging device.

In another exemplary embodiment of the disclosed mode selection assemblies, the first photoelectric sensor and the second photoelectric sensor attached to an adjacency of the lens ring on a body of the imaging device.

In another exemplary embodiment of the disclosed mode selection assemblies, the selecting ring comprises a circular plate arranged at an end of the selecting ring, the end being closer to the body.

In another exemplary embodiment of the disclosed mode selection assemblies, the circular plate is provided with a plurality of openings for exposing the first photoelectric sensor and the second photoelectric sensor.

In another exemplary embodiment of the disclosed mode selection assemblies, a distance between adjacent openings is less or greater than a distance between the first photoelectric sensor and the second photoelectric sensor.

In another exemplary embodiment of the disclosed mode selection assemblies, both of the first photoelectric sensor and the second photoelectric sensor are sheltered when the selecting ring is at a gear position.

In another exemplary embodiment of the disclosed mode selection assemblies, the first photoelectric sensor and the second photoelectric sensor are connected with a digital signal processor ("DSP") of the imaging device.

In another exemplary embodiment of the disclosed mode selection assemblies, a pulse is triggered when the first photoelectric sensor is exposed before the second photoelectric sensor, and vice versa.

Exemplary embodiments of the disclosed mode selection assemblies further comprise a plurality of selecting ring mounting brackets attached to the gear ring for engaging the selecting ring with the gear ring.

Exemplary embodiments of the disclosed mode selection assemblies further comprise a front cover for sealing the imaging device and/or the lens barrel.

In another exemplary embodiment of the disclosed mode selection assemblies, the front cover is associated with the gear ring.

In accordance with another aspect disclosed herein, there is set forth an imaging device for selecting an imaging mode from among a plurality of imaging modes, comprising:
a body;
a lens barrel coupled to the body; and
a mode selection assembly provided for performing any one of previous embodiments of the disclosed procedures, being coupled to the lens barrel for selecting the imaging mode.

In an exemplary embodiment of the disclosed imaging device, the imaging device is a compact imaging device.

In another exemplary embodiment of the disclosed imaging devices, an outer diameter of the mode selection assembly is between one centimeter and ten centimeters, inclusive.

In another exemplary embodiment of the disclosed imaging devices, an inner diameter of the mode selection assembly is between one tenth of a centimeter and ten centimeters, inclusive.

In another exemplary embodiment of the disclosed imaging devices, the imaging device can be in a shape selected from a group consisting of a cubic, a cuboid, a sphere, a cylinder or a prism.

In another exemplary embodiment of the disclosed imaging devices, a front scale of the imaging device is between one centimeter and ten centimeters, inclusive.

In another exemplary embodiment of the disclosed imaging devices, the front scale comprises at least one of a width, a height, a diameter and a diagonal.

In another exemplary embodiment of the disclosed imaging devices, a thickness of the imaging device is between one tenth of a centimeter and five centimeters, inclusive.

In another exemplary embodiment of the disclosed imaging devices, the outer diameter of the mode selection assembly is less, equal or greater than the front scale of the imaging device.

In another exemplary embodiment of the disclosed imaging devices, a ratio of the outer diameter to the front scale is between twentieth and ten, inclusive.

In another exemplary embodiment of the disclosed imaging devices, the mode selection signal triggers an imaging operation of the imaging device.

In another exemplary embodiment of the disclosed imaging devices, the imaging operation comprises capturing one or more pictures with the selected imaging mode.

In accordance with another aspect disclosed herein, there is set forth a method for manufacturing an imaging device, comprising:
attaching a selecting ring to a lens barrel of the imaging device; and
enabling the selecting ring to select the imaging mode from among a plurality of imaging modes of the imaging device by turning the selecting ring.

Exemplary embodiments of the disclosed methods further comprise coupling a gear ring to the lens barrel or a housing of the imaging device.

Exemplary embodiments of the disclosed methods further comprise engaging the selecting ring with the gear ring to form a plurality of gear positions Exemplary embodiments of the disclosed methods further comprise corresponding at least one of the gear positions to a selected imaging mode selected from the plurality of imaging modes.

In another exemplary embodiment of the disclosed methods, enabling the selecting ring comprises corresponding the imaging mode to the chosen gear position.

Exemplary embodiments of the disclosed methods further comprise coupling a lens ring to a lens barrel of the imaging device.

Exemplary embodiments of the disclosed methods further comprise installing a plurality of photoelectric sensors for detecting a user selection.

In another exemplary embodiment of the disclosed methods, installing the photoelectric sensors comprise installing a first photoelectric sensor and a second photoelectric sensor with a first distance between the first photoelectric sensor and the second photoelectric sensor.

In another exemplary embodiment of the disclosed methods, attaching the selecting ring comprises attaching a circular plate to the selecting ring for sheltering or exposing the first photoelectric sensor and/or the second photoelectric sensor.

In another exemplary embodiment of the disclosed methods, attaching the circular plate comprises providing a plurality of openings on the circular plate for exposing the photoelectric sensors.

In another exemplary embodiment of the disclosed methods, providing the plurality of openings comprises providing the openings evenly with a second distance, being different from the first distance between the first photoelectric sensor and the second photoelectric sensor.

Exemplary embodiments of the disclosed methods further comprise connecting the first photoelectric sensor and the second photoelectric sensor to a digital signal processor ("DSP") of the imaging device.

Exemplary embodiments of the disclosed methods further comprise providing a front cover, attached to the housing of the imaging device and/or the lens barrel, for sealing the imaging device and/or the lens barrel.

In another exemplary embodiment of the disclosed methods, providing the front cover comprises associating the gear ring with the front cover.

Exemplary embodiments of the disclosed methods further comprise installing a gear ring to the lens barrel or to the front cover.

Exemplary embodiments of the disclosed methods further comprise corresponding at least one of the gear positions to a selected imaging mode selected from the plurality of imaging modes.

Exemplary embodiments of the disclosed methods further comprise providing two or more bulges extending from the gear ring for the engaging the selecting ring.

In another exemplary embodiment of the disclosed methods, enabling the selecting ring comprises defining two or more recesses on the selecting ring for engaging the bulges of the gear ring.

In another exemplary embodiment of the disclosed methods, a first number of the recesses is greater than a second number of the bulges.

In another exemplary embodiment of the disclosed methods, the first number is at least three times the second number.

In accordance with another aspect disclosed herein, there is set forth a mode selection assembly of an imaging device, comprising:
a selecting ring coupled to the imaging device,
wherein an imaging mode is selected from among a plurality of imaging modes of the imaging device by turning the selecting ring.

In another exemplary embodiment of the disclosed mode selection assemblies, the selecting ring comprises a plurality of gear positions.

In another exemplary embodiment of the disclosed mode selection assemblies, a change of the gear position of the selecting ring triggers a mode selection signal.

In another exemplary embodiment of the disclosed mode selection assemblies, the mode selection signal is passed to a controller of the imaging device for selecting the imaging mode.

In another exemplary embodiment of the disclosed mode selection assemblies, the mode selection signal corresponds to a selected imaging mode.

In another exemplary embodiment of the disclosed mode selection assemblies, a first imaging mode is selected when the mode selection assembly is turned clockwise, wherein a second imaging mode is selected when the mode selection assembly is turned counterclockwise, and wherein the first imaging mode is different from the second imaging mode.

Exemplary embodiments of the disclosed mode selection assemblies further comprise a plurality of contact pairs, each pair corresponding to a selected imaging mode.

In another exemplary embodiment of the disclosed mode selection assemblies, the mode selection signal corresponding to the selected imaging mode is generated when a corresponding contact pair is connected with a conductive path.

In another exemplary embodiment of the disclosed mode selection assemblies, the selecting ring comprises a mechanism to form the conductive path for a selected contact pair at each gear position.

In another exemplary embodiment of the disclosed mode selection assemblies, the mode selection signal corresponds to a change of the imaging mode.

In another exemplary embodiment of the disclosed mode selection assemblies, the change of the imaging mode is reflected by a directional turn of the selecting ring.

Exemplary embodiments of the disclosed mode selection assemblies further comprise two photoelectric sensors for generating the mode selection signal when a selected photoelectric sensor is exposed.

In another exemplary embodiment of the disclosed mode selection assemblies, the selected photoelectric sensor can be exposed by turning the selecting ring.

In another exemplary embodiment of the disclosed mode selection assemblies, the two photoelectric sensors are exposed in a different order when the selecting ring is turned.

In accordance with another aspect disclosed herein, there is set forth an imaging device for selecting an imaging mode from among a plurality of imaging modes, comprising:
a body;
a lens barrel coupled to the body; and
a mode selection assembly coupled to the lens barrel for selecting the imaging mode.

In an exemplary embodiment of the disclosed imaging devices, the mode selection assembly comprises:
a selecting ring coupled to the imaging device,
wherein an imaging mode is selected from among a plurality of imaging modes of the imaging device by turning the selecting ring.

In an exemplary embodiment of the disclosed imaging devices, the selecting ring comprises a plurality of gear positions.

In an exemplary embodiment of the disclosed imaging devices, a change of the gear position of the selecting ring triggers a mode selection signal.

In an exemplary embodiment of the disclosed imaging devices, the mode selection signal is passed to a controller of the imaging device for selecting the imaging mode.

In an exemplary embodiment of the disclosed imaging devices, the mode selection signal corresponds to a selected imaging mode.

In an exemplary embodiment of the disclosed imaging devices, a first imaging mode is selected when the mode selection assembly is turned clockwise, wherein a second imaging mode is selected when the mode selection assembly is turned counterclockwise, and wherein the first imaging mode is different from the second imaging mode.

Exemplary embodiments of the disclosed imaging devices further comprises a plurality of contact pairs, each pair corresponding to a selected imaging mode.

In an exemplary embodiment of the disclosed imaging devices, the mode selection signal corresponding to the selected imaging mode is generated when a corresponding contact pair is connected with a conductive path.

In an exemplary embodiment of the disclosed imaging devices, the selecting ring comprises a mechanism to form the conductive path for a selected contact pair at each gear position.

In an exemplary embodiment of the disclosed imaging devices, the mode selection signal corresponds to a change of the imaging mode.

In an exemplary embodiment of the disclosed imaging devices, the change of the imaging mode is reflected by a directional turn of the selecting ring.

Exemplary embodiments of the disclosed imaging devices further comprises two photoelectric sensors for generating the mode selection signal when a selected photoelectric sensor is exposed.

In an exemplary embodiment of the disclosed imaging devices, the selected photoelectric sensor can be exposed by turning the selecting ring.

In an exemplary embodiment of the disclosed imaging devices, the two photoelectric sensors are exposed in a different order when the selecting ring is turned.

In an exemplary embodiment of the disclosed imaging devices, the imaging device is a compact imaging device.

In another exemplary embodiment of the disclosed imaging devices, an outer diameter of the mode selection assembly is between one centimeter and ten centimeters, inclusive.

In another exemplary embodiment of the disclosed imaging devices, an inner diameter of the mode selection assembly is between one tenth of a centimeter and ten centimeters, inclusive.

In another exemplary embodiment of the disclosed imaging devices, the imaging device can be in a shape selected from a group consisting of a cubic, a cuboid, a sphere, a cylinder or a prism.

In another exemplary embodiment of the disclosed imaging devices, a front scale of the imaging device is between one centimeter and ten centimeters, inclusive.

In another exemplary embodiment of the disclosed imaging devices, the front scale comprises at least one of a width, a height, a diameter and a diagonal.

In another exemplary embodiment of the disclosed imaging devices, a thickness of the imaging device is between one tenth of a centimeter and five centimeters, inclusive.

In accordance with another aspect disclosed herein, there is set forth a method for manufacturing an imaging device, comprising:

attaching a selecting ring to a lens barrel of the imaging device; and enabling the selecting ring to select an imaging mode from among a plurality of imaging modes of the imaging device by turning the selecting ring.

Exemplary embodiments of the disclosed methods further comprises installing the selecting ring with a plurality of gear positions.

In an exemplary embodiment of the disclosed methods, enabling the selecting ring comprises corresponding at least one of the gear positions to a selected imaging mode selected from the plurality of imaging modes.

In another exemplary embodiment of the disclosed methods, enabling the selecting ring comprises enabling a controller of the imaging device to receive the mode selection signal for selecting the imaging mode.

Exemplary embodiments of the disclosed methods further comprises corresponding the mode selecting signal to a selected imaging mode.

In another exemplary embodiment of the disclosed methods, corresponding the mode selecting signal comprises associating a first imaging mode to a clockwise turn of the selecting ring and associating a second imaging mode to a counterclockwise turn of the selecting ring, and wherein the first imaging mode is different from the second imaging mode.

Exemplary embodiments of the disclosed methods further comprises attaching a plurality of contact pairs to the imaging device, each pair corresponding to a selected imaging mode.

In another exemplary embodiment of the disclosed methods, enabling the selecting ring comprises enabling a generation of a signal corresponding to the selected imaging mode when a corresponding contact pair is connected with a conductive path.

Exemplary embodiments of the disclosed methods further comprises installing a mechanism to form the conductive path for a selected contact pair at each gear position.

Exemplary embodiments of the disclosed methods further comprises corresponding the mode selecting signal to a change of the imaging mode.

In another exemplary embodiment of the disclosed methods, corresponding the mode selecting signal comprises enabling the change of the imaging mode to be reflected by a directional turn of the selecting ring.

Exemplary embodiments of the disclosed methods further comprises installing two photoelectric sensors for generating the mode selection signal when a selected photoelectric sensor is exposed.

In another exemplary embodiment of the disclosed methods, generating the mode selection signal comprises enabling the selected photoelectric sensor to be exposed by turning the selecting ring.

Exemplary embodiments of the disclosed methods further comprises enabling the two photoelectric sensors to be exposed in a different order when the selecting ring is turned.

Figure 1:
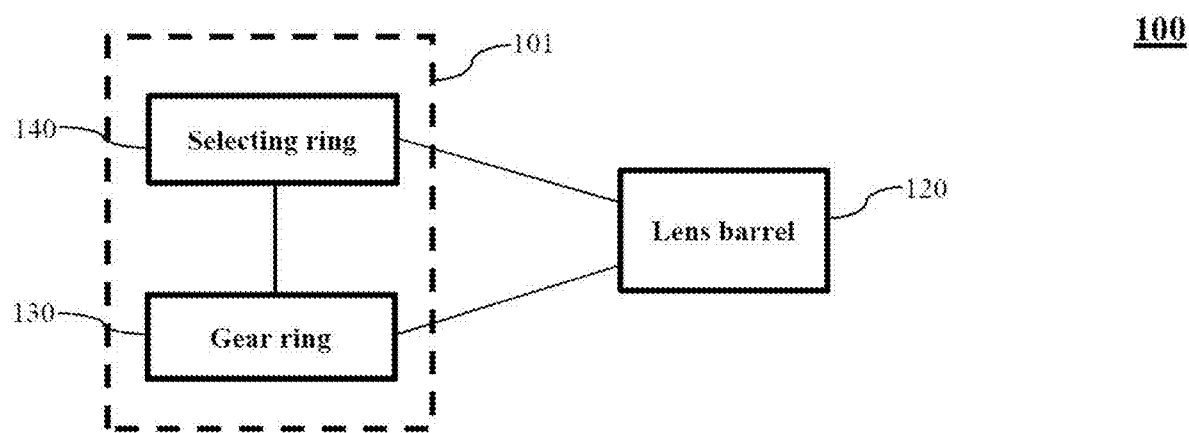
FIG. 1 is an exemplary top-level block diagram illustrating an embodiment of a mode selection assembly for selecting an imaging mode, wherein the mode selection assembly includes a selecting ring and a gear ring.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Imaging devices typically provide a push button, a combination key or other selection control switch for switching among imaging modes, including, but not limited to, a single shot mode, a burst mode, a protune mode, a timelapse photo mode, a time video mode, a night photo mode and the like. Manipulation of the selection control switch, however, is complicated and not enjoyable.

Since currently-available imaging devices for selecting imaging modes are complicated to operate and unenjoyable to use, a mode selection assembly system and method that can operate easily and enjoyably when selecting from among imaging modes of an imaging device can prove desirable. This result can be achieved, according to one embodiment of mode selection assembly 101 illustrated in FIG. 1.

FIG. 1 illustrates an embodiment of a mode selection assembly 101. The mode selection assembly 101 can be coupled with an imaging device 100 and be utilized for selecting from among various imaging modes of the imagine device 100. As shown in FIG. 1, the mode selection assembly 101 can comprise a gear ring 130 and a selecting ring 140. In FIG. 1, the gear ring 130 is associated with a lens barrel 120 of the imaging device 100 and can be provided with two or more gear positions. The gear ring 130 can be provided as a sleeve of the lens barrel 120. The gear positions of the gear ring 130 can be formed with cooperative engagements (not shown) with the selecting ring 140. Stated somewhat differently, the gear ring 130 and the selecting ring 140 can cooperate. Additional detail regarding the gear positions and the engagements will be provided below with reference to FIGS. 8 and 9.

The selecting ring 140 can enable a user to select a desired imaging mode or make a desired change to a current imaging mode by turning the selecting ring 140. In some embodiments, a turn (or a gear position change) of the selecting ring 140 can trigger a signal that indicates a desired imaging mode, e.g., a single shot mode, of the imaging device 100. In such embodiments, when the user turns the selecting ring 140, a desired gear position can be selected. The desired gear position can correspond to a predetermined imaging mode of the imaging device 100. The imaging device 100 can switch to the desired imaging mode according to the user selection. Additional detail regarding how the gear position corresponds to the imaging mode will be provided below with reference to FIGS. 2-9.

In some other embodiments, the turn of the selecting ring 140 can trigger a signal that indicates a change to the imaging mode of the imaging device 100. In such embodiments, when the user turns the selecting ring 140, a directional change signal can be triggered and sent to a controller (not shown) of the imaging device 100. The controller can select an imaging mode based upon the directional change signal, a current selection and an imaging mode menu of the imaging device 100. As an exemplary example, the controller can select an item direct above the current selection of an imaging mode menu or an item direct below the current selection of the imaging mode menu when the selecting ring 140 is directionally turned by one gear position. Alternatively and/or additionally, the controller can select an item that is two or more items above the current selection or an item two or more items below the current selection when the selection ring 140 is directionally turned by two or more gear positions continuously.

Although shown and described as using the gear ring 130 and the selecting ring 140 for purposes of illustration only, the mode selection assembly 101 can use any suitable turning components to switch among imaging modes, including, but not limited to, one or more lens collars. The mode selection assembly 101 advantageously can be easily operated to select the desired imaging mode.

Figure 2:
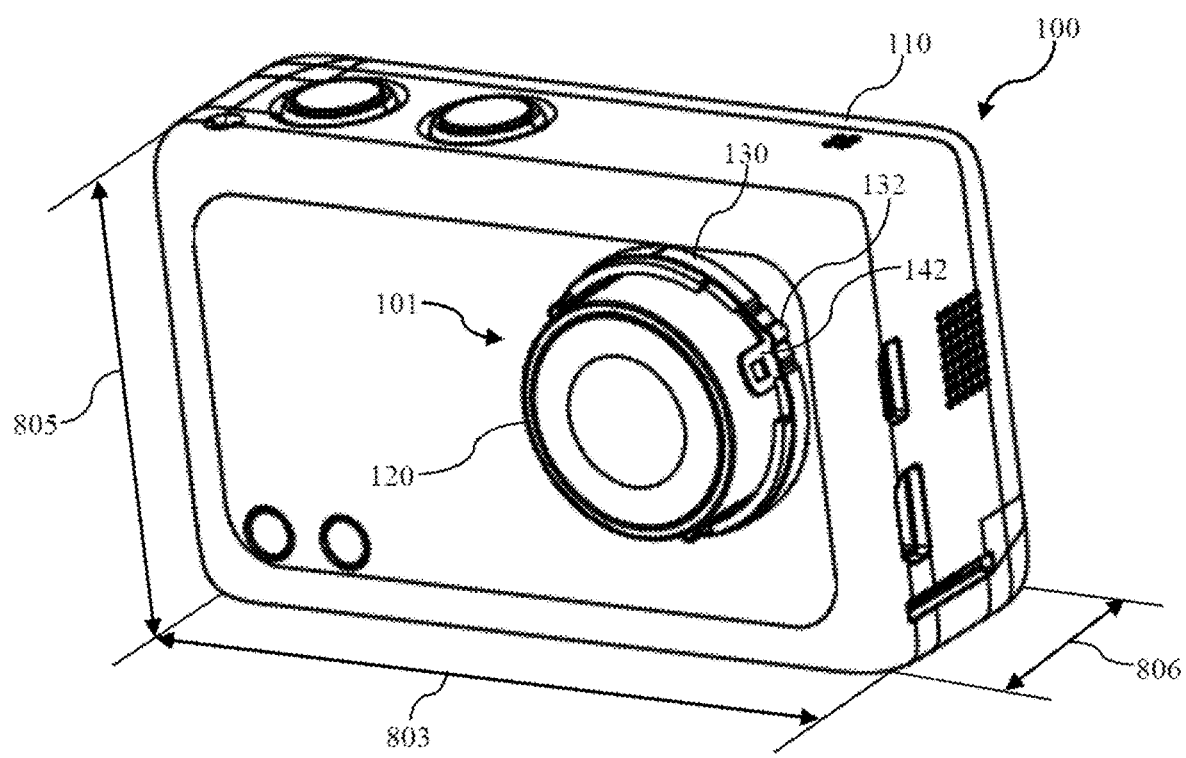
FIG. 2 is an exemplary schematic diagram illustrating an embodiment of the gear ring of FIG. 1 attached to an imaging device.

FIG. 2 illustrates an embodiment of the mode selection assembly 101 of the imaging device 100. As shown in FIG. 2, the mode selection assembly 101 has a gear ring 130. The imaging device 100 of FIG. 2 can comprise a body 110 coupled with a lens barrel 120. The lens barrel 120 can support a lens for capturing images and can be coupled with the mode selection assembly 101. In FIG. 2, the gear ring 130 can include one or more bulges 132 for engaging the selecting ring 140 (shown in FIG. 4).

Additionally and/or alternatively, the gear ring 130 can include one or more mounting bracket 142 for engaging the selecting ring 140. In some embodiments, a plurality of the mounting brackets 142 can engage the selecting ring 140. The mounting brackets 142 can be extended from a second rotatable ring 131 (shown in FIG. 3) that is part of the gear ring 130. The mounting brackets 142 can be evenly and/or unevenly distributed around a circumference of the gear ring 130.

Although shown and described with one gear position corresponding to one imaging mode for purposes of illustration only, a greater number of the gear positions can correspond with a selected number of imaging modes. Although shown and described as extending from the gear ring 130 for purposes of illustration only, the mounting brackets 142 can extend from other components, such as the lens barrel 120.

In some embodiments, the imaging device 100 can be a compact imaging device, e.g. a compact camera or a sports camera, in a cuboid shape, a cubic shape, a sphere shape, a cylinder shape or a prism shape. In FIG. 2, the imaging device 100 in the cuboid shape can have a front scale measured with a width 803 and a height 805. The front scale, e.g., the width 803 or the height 805, can be between one centimeter and ten centimeters, inclusive, including any value sub-ranges, such as a one centimeter sub-range (e.g., between five centimeters and six centimeters, inclusive), a two centimeter sub-range, a three centimeter sub-range, a four centimeter sub-range, a five centimeter sub-range, a six centimeter sub-range, a seven centimeter sub-range, an eight centimeter sub-range and a nine centimeter sub-range. The front scale of the imaging device 100 can be a square, a rectangle, a round or a polygon shape and can be measured with at least a width 803, a height 805, a diameter, a diagonal (not shown) and the like. The front scale of the imaging device 100 of any of the listed shape can be between one centimeter and ten centimeters, inclusive, including any value sub-ranges, such as a one centimeter sub-range (e.g., between five centimeters and six centimeters, inclusive), a two centimeter sub-range, a three centimeter sub-range, a four centimeter sub-range, a five centimeter sub-range, a six centimeter sub-range, a seven centimeter sub-range, an eight centimeter sub-range and a nine centimeter sub-range.

The imaging device 100 can also have a thickness 806 that can be between one tenth of a centimeter and five centimeters, inclusive, including any value sub-ranges, such as a one ninth centimeter sub-range (e.g., between one tenth centimeter and one centimeter, inclusive), a one centimeter sub-range, a two centimeter sub-range, a three centimeter sub-range, a four centimeter sub-range, a five centimeter sub-range. Although shown and described as having the thickness 806 of a cuboid shape for illustrative purposes only, the thickness 806 of the imaging device 100 in any other shape can have a similar measurement between one tenth of a centimeter and five centimeters, inclusive, including any value sub-ranges, such as one ninth centimeter sub-range (e.g., between one tenth centimeter and one centimeter, inclusive), a one centimeter sub-range, a two centimeter sub-range, a three centimeter sub-range, a four centimeter sub-range, a five centimeter sub-range.

Figure 3:
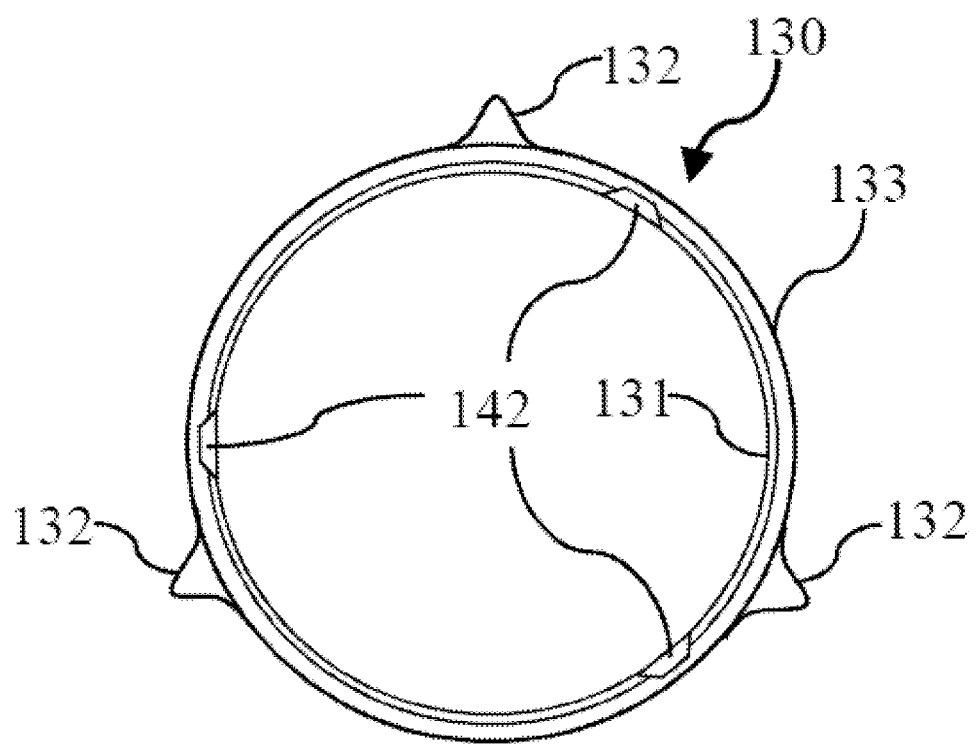
FIG. 3 is an illustrative diagram showing an embodiment of the gear ring of FIG. 2, wherein the gear ring includes bulges and mounting brackets.

FIG. 3 illustrates an embodiment of a gear ring 130 of the mode selection assembly 101. The gear ring 130 can have an outer ring 133 and an inner ring 131, being rotatably engaged together, i.e. the inner ring 131 can rotate while the outer ring 133 stays still. In FIG. 3, three bulges 132 are extended from the outer ring 133 that is not rotatable. The bulges 132 can be spring bulges for better engagement with a selecting ring 140 (shown in FIG. 4).

Three mounting brackets 142 can be extended from the inner ring 131 and can rotate relative to the outer ring 133. The three mounting brackets 142 can also engage with the selecting ring 140. Additional detail regarding the engagement between the gear ring 130 and the selecting ring 140 via the bulges 132 and the mounting brackets 142 will be set forth below with reference to FIGS. 8 and 9.

Although shown and described as being three bulges 132 and three mounting brackets 142 for purposes of illustration only, the mode selection assembly 101 can be provided with any suitable number of bulges 132 and/or mounting brackets 142, e.g. two, four or more.

Figure 4:
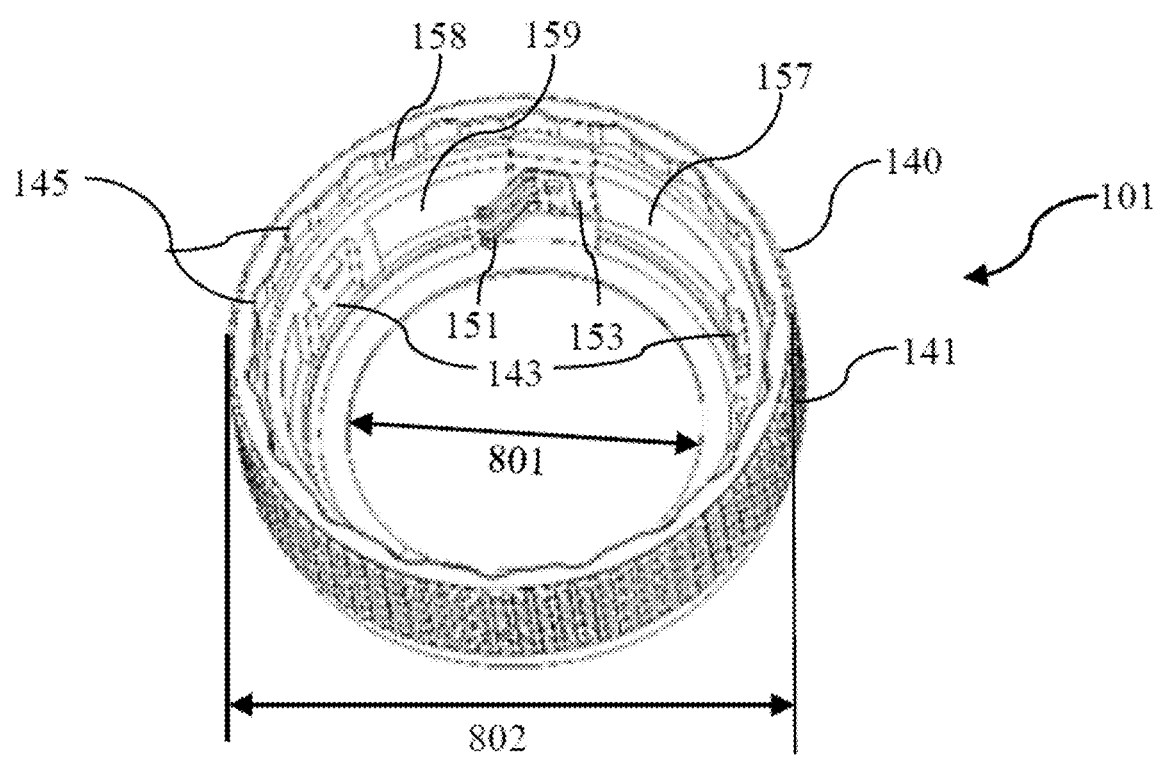
FIG. 4 is an exemplary schematic diagram illustrating an embodiment of the selecting ring of FIG. 1, wherein the selecting ring includes a contact switch.

FIG. 4 illustrates an embodiment of the selecting ring 140 of the mode selection assembly 101. Turning to FIG. 4, the selecting ring 140 can have a ring body 141. The ring body 141 can be in a shape and with a dimension to go around the lens barrel 120 (shown in FIG. 2). The ring body 141 defines an opening for receiving the lens barrel 120. The lens barrel 120 can be at least partially, and/or entirely, received by the opening formed in the ring body 141. The ring body 141 can have an inner surface 157 that can include a first circular section 158 and a second circular section 159.

The first circular section 158 of the ring body 141 can define a plurality of recesses 145 for engaging the bulges 132 of the gear ring 130 (collectively shown in FIG. 2). Additional detail regarding the recesses 145 will be provided below with reference to FIGS. 8 and 9.

When being turned, the selecting ring 140 can rotate with the recesses 145 relative to the gear ring 130. Each of the bulges 132 thereby can move from a selected recess 145 to a next recess 145 adjacent to the selected recess 145. In some embodiments, the move to the next recess 145 can be indicated via a click sound. In some embodiments, a first number of the bulges 132 can be less than a second number of the recesses 145. The second number of the recesses 145 can be at least three times the first number of the bulges 132.

The second circular section 159 of the ring body 141 can have a plurality of adapters 143 for engaging the mounting brackets 142 extended from the gear ring 130. The adapters 143 can be evenly and/or unevenly distributed around a circumference of the selecting ring 140. A third number of the mounting brackets 142 can be equal to, and/or different from, a fourth number of the adapters 143. An arrangement, shapes and dimensions of the adapters 143 can be constructed to match the mounting brackets 142. The adapters 143 can be matched with the mounting brackets 142 when at least one of the adaptors 143 is engaged with one of the mounting brackets 142. For purposes of illustration but not of limitation, the arrangement of the brackets 142 and the adapters 143 can help to guarantee that two or more of the brackets 142 can engage the adapters 143 for a secured engagement.

Figure 6:
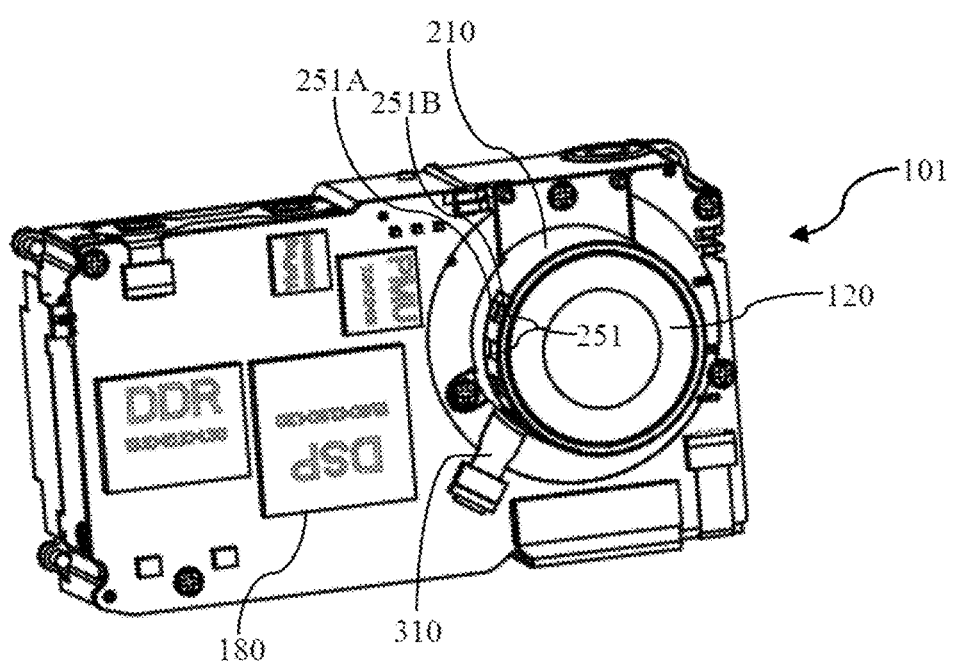
FIG. 6 is an exemplary detail diagram illustrating an alternative embodiment of the mode selection assembly of FIG. 1, wherein the mode selection assembly has a lens ring with a plurality of pairs of contacts.

As shown in FIG. 4, the selecting ring 140 can include an optional contact switch 151 for connecting a pair of contacts 251 (shown in FIG. 6). The contact switch 151 can be at least partially integrated with the selecting ring 140 and/or attached to the selecting ring 140 via, for example, a mounting base 153 as illustrated in FIG. 3. When the selecting ring 140 is turned, the contact switch 151 can also be turned, connecting a pair of corresponding contacts 251. In some embodiments, gear positions defined by the bulge 132 and the recess 145 can exactly or roughly match connecting points of the contact switch 151 and the pair of contacts 251 being aligned to make secured conductivity between the two contacts 251. Additional detail regarding the gear positions and the contact switch 151 will be provided with reference to FIGS. 8 and 9.

Although shown and described as having a contact switch 151 for purposes of illustration only, the selecting ring 140 can employ alternative mechanisms to conductively connect the pair of contacts 251 when the selecting ring 140 is turned.

The selecting ring 140 can have an inner diameter 801 and an outer diameter 802. The inner diameter 801 and the outer diameter 802 can define an inner diameter and an outer diameter of the mode selection assembly 101. In some embodiments, the inner diameter of the mode selection assembly 101 can be between one tenth of a centimeter and ten centimeters, inclusive, including any value sub-ranges, such as a one ninth centimeter sub-range (e.g., between one tenth centimeter and one centimeter, inclusive), a one centimeter sub-range (e.g., between five centimeters and six centimeters, inclusive), a two centimeter sub-range, a three centimeter sub-range, a four centimeter sub-range, a five centimeter sub-range, a six centimeter sub-range, a seven centimeter sub-range, an eight centimeter sub-range and a nine centimeter sub-range. The outer diameter 802 of the mode selection assembly 101 can be between one centimeter and ten centimeters, inclusive, including any value sub-ranges, such as a one centimeter sub-range (e.g., between five centimeters and six centimeters, inclusive), a two centimeter sub-range, a three centimeter sub-range, a four centimeter sub-range, a five centimeter sub-range, a six centimeter sub-range, a seven centimeter sub-range, an eight centimeter sub-range and a nine centimeter sub-range.

In some embodiments, the outer diameter 812 can be less, equal or greater than a front scale, such as the width 813 or the height 815 (collectively shown in FIG. 16), of the imaging device 500. In some exemplary embodiments, the ratio of the outer diameter 802 to the front scale of the imaging device 100 can be between one twentieth to ten, inclusive, including any value sub-ranges, such as a one tenth sub-range (e.g., between one tenth and one fifth, inclusive), a one fifth sub-range, a one fourth sub-range, a half sub-range, a one sub-range, a two sub-range, a three sub-range, a four sub-range, a five sub-range, a six sub-range, a seven sub-range, an eight sub-range and a nine sub-range.

Figure 5:
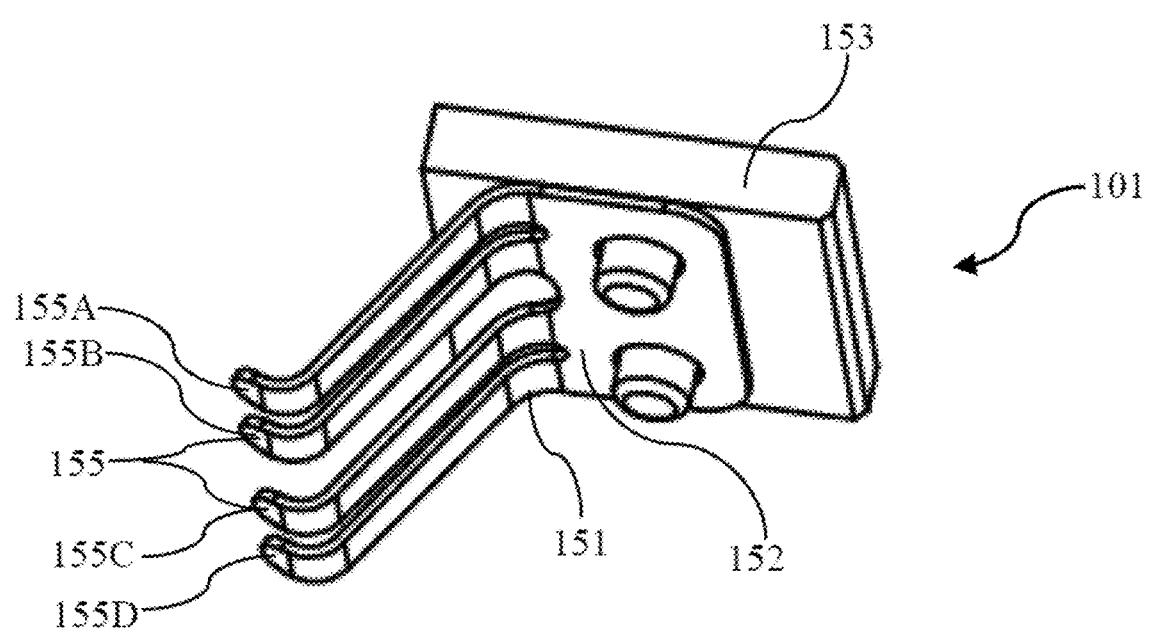
FIG. 5 is an exemplary detail diagram illustrating an embodiment of the contact switch of FIG. 4, wherein the contact switch has contact fingers and a base.

FIG. 5 illustrates another embodiment of the mode selection assembly 101, wherein a contact switch 151 can be provided for connecting a pair of contacts 251 (shown in FIG. 6). In FIG. 5, the contact switch 151 can have at least two fingers 155 for contacting each contact of the pair of contacts 251. In some embodiments, two or more fingers 155 can be employed for contacting each contact of the pair of contacts 251 for providing a more-secure contact effect between the fingers 155 and the contacts 251.

In FIG. 5, the contact switch 151 is shown as having four fingers 155A, 155B, 155C and 155D. Among the four fingers 155A, 155B, 155C and 155D, two fingers 155A and 155B can contact a first selected contact 251A and the other two fingers 155C and 155D can contact a second selected contact 251B (collectively shown in FIG. 6). At least two of the fingers 155, e.g. fingers 155B and 155C, can be connected to form an electrically conductive path via a palm 152. The electrically conductive path can allow an electric current to pass between the fingers 155 and between the contacts 251A and 251B. The palm 152 can be mounted to a mounting base 153. The mounting base 153 can be mounted to a suitable position of the selecting ring 140. The fingers 155 thereby can securely contact the contacts 251 when the selecting ring 140 is at least at some of the gear position.

Although shown and described as being finger shape for purposes of illustration only, the contact switch 151 can be provided with any suitable shape and/or configuration for connecting the two contacts 251, as long as the switch 151 can move as the selecting ring 140 is rotated and can make secured connection between the contacts 251.

FIG. 6 illustrates another embodiment of the exemplary mode selection assembly 101 of the imaging device 100. As shown in FIG. 6, the mode selection assembly 101 has a lens ring 210 with a plurality pairs of contacts 251 (or contact pairs). In FIG. 6, each of the pairs of contacts 251 can consist of two contacts 251A, 251B that can be electrically insulated from each. In other words, no conductive path exists between the two contacts 251A, 251B. As shown and described above with reference to FIG. 5, the contacts 251A and 251B of a selected pair can be connected via the contact switch 151 when fingers 155 of the contact switch 151 touch the contacts 251A and 251B.

Each pair of the contacts 251 can be connected to a pair of conductive wires (not shown) contained in a cable, such as a flexible flat cable ("FFC") 310. The FFC 310 can have a plurality pairs of wires (not shown). At least some pairs of the conductive wires can be conductively connected to corresponding pairs of conducts 251. Other ends of the conductive wires of the FFC 310 can be connected to a controller of the imaging device 100, including, but not limited to, a digital signal processor ("DSP") 180. When a pair of contacts 251 is connected by the contact switch 151, a connection signal can be passed, via the FFC 310, to the DSP 180. The connection signal can correspond to a selected gear position that corresponds to a selected imaging mode. The DSP 180 can select the selected imaging mode based on the connection signal.

Although shown and described as being separate pairs of conductive wires for purposes of illustration only, the FFC 310 can use shared conductive wires, e.g. a shared neutral (or return) wire.

Figure 7:
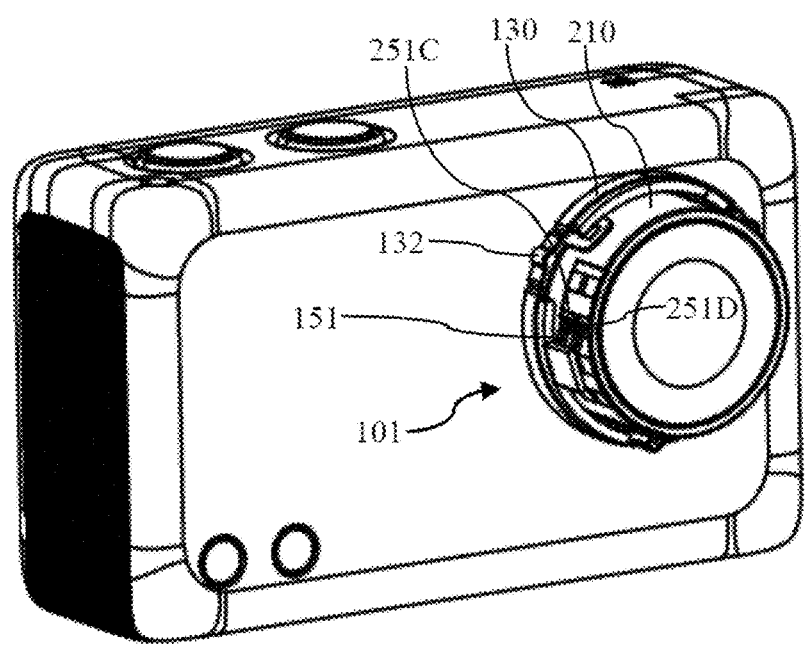
FIG. 7 is an exemplary detail diagram illustrating an alternative embodiment of the mode selection assembly of FIG. 6, wherein a selected pair of contacts can be connected with the contact switch of FIG. 5.

FIG. 7 illustrates another embodiment of an alternative mode selection assembly 101. Turning to FIG. 7, a selected pair of contacts 251C, 251D can be connected with a contact switch 151. In FIG. 7, the mode selection assembly 101 can comprise a gear ring 130, a contact switch 151 and a lens ring 210. Between the gear ring 130 and a selecting ring 140, a plurality of bulges 132 of the gear ring 130 can engage with a plurality of recesses 145 (collectively shown in FIG. 4) of the selecting ring 140. Between the lens ring 210 and the selecting ring 140, the contact switch 151, mounted on the selecting ring 140, can engage with a selected pair of contacts 251 of the lens ring 210.

In FIG. 7, a process of selecting an imaging mode can start with a turn of the selecting ring 140. When the selecting ring 140 is turned, as described herein, the contact switch 151 attached to the selecting ring 140 can also be turned along with the selecting ring 140. The contact switch 151 can make connections with a selected pair of contacts 251 of the lens ring 210 while the selecting ring 140 is at a gear position as shown and described with reference to FIG. 4. The selected pair of contacts 251 can be conductively connected by the contact switch 151 to signal an imaging mode selection. The connection position between the contact switch 151 and the contacts 251 can correspond to an engagement position of the bulge 132 and the recess 145.

Although shown and described as connecting the selected pair of contacts 251 while the selecting ring 140 is at the gear position for purposes of illustration only, the contact switch 151 can connect the selected pair of contacts 351 while the selecting ring 140 is being turned. In some embodiments, the selected pair of contacts 351 can be connected by the contact switch 151 when the selecting ring 140 is between two gear positions to signal the imaging mode selection.

When a pair of contacts 251 is selected, the selection signal can pass along a FFC 310 to a DSP 180 (collectively shown in FIG. 6) of the imaging device 100. As described herein, each pair of wires in the FFC 310 can be connected to a pair of contacts 251. Therefore, when the pair of contacts 251 is connected with the contact switch 151, the connection signal can be passed along the pair of wires in the FFC 310 to the DSP 180.

Although shown and described as comprising a selecting ring 140, a gear ring 130 and a lens ring 210 for illustration purposes only, the mode selection assembly 101 can contain other components, e.g. mounting mechanisms for the selecting ring 140, the gear ring 130 and lens ring 210 and the like.

Figure 8:
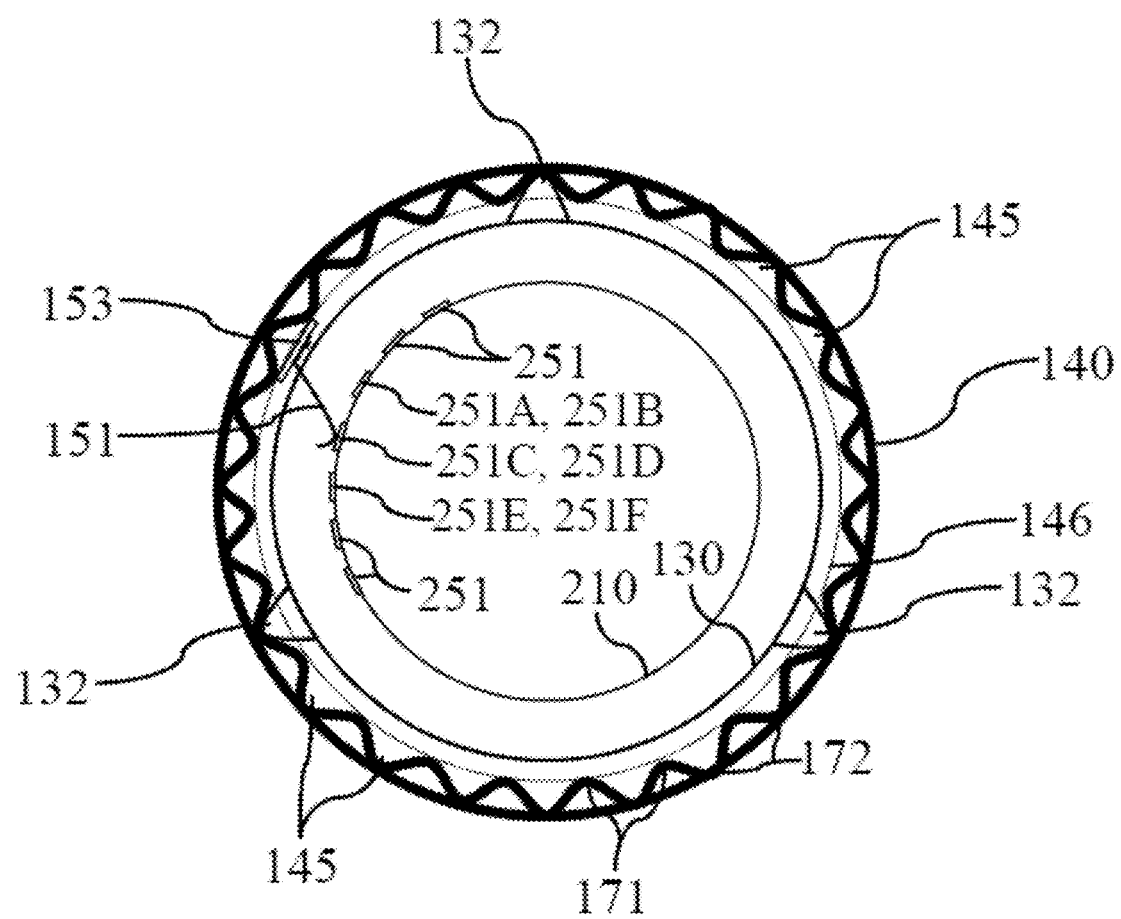
FIG. 8 is an illustrative diagram showing an alternative embodiment of the mode selection assembly of FIG. 7, wherein the selecting ring engages the gear ring, and the contact switch connects a selected pair of contacts.

FIG. 8 illustrates an embodiment of the mode selection assembly 101. The mode selection assembly 101 includes a selecting ring 140 engaging a gear ring 130, and a contact switch 151 connecting a selected pair of contacts 251. In FIG. 8, as shown and described herein, the selecting ring 140 can define a plurality of recesses 145 with a portion of an inner surface of the selecting ring 140, as shown and described with reference to FIG. 4. Each of the recesses 145 can be defined by a valley 172 and two plateaus 171.

A plurality of bulges 132 can be extended from the gear ring 130 for engaging the recesses 145 of the selecting ring 140. The bulges 132 can be spring bulges for purposes of engaging the selecting ring 140 and being able to pass plateaus 171 when the selecting ring 140 is turned. When the selecting ring 140 is rotated by a user, each of the bulges 132 can go from one recess 145 to another. Because the bulges 132 cannot rotate, each of the recesses 145 can form a gear position, i.e. the selecting ring 140 can be stable when the bulges 132 are engaged in respective recesses 145.

When the selecting ring 140 is turned, the recesses 145 arranged around an inner side of the selecting ring 140 can in turn be engaged with the bulges 132 arranged around an outer side of the gear ring 130. Arrangements and numbers of the bulges 132 and the recesses 145 can ensure smooth rotations of the selecting ring 140 and to provide a user with click signal while operating the selecting ring 140.

In FIG. 8, a plurality of contact pairs 251 can be provided on a lens ring 210. A contact switch 151 can be provided for connecting a selected pair of contacts 251. The selected pair of contacts 251, e.g. the pair 251C, 251D, when the bulges 132 are engaged in the recesses 145. When the selecting ring 140 is turned, the bulges 132 change the recesses 145 and the contact switch 151 can move to a next pair of contacts 151. As an example, when the selecting ring 140 is turned clockwise, the contact switch 151 can move to the next pair of contacts 251A, 251B.

Figure 9:
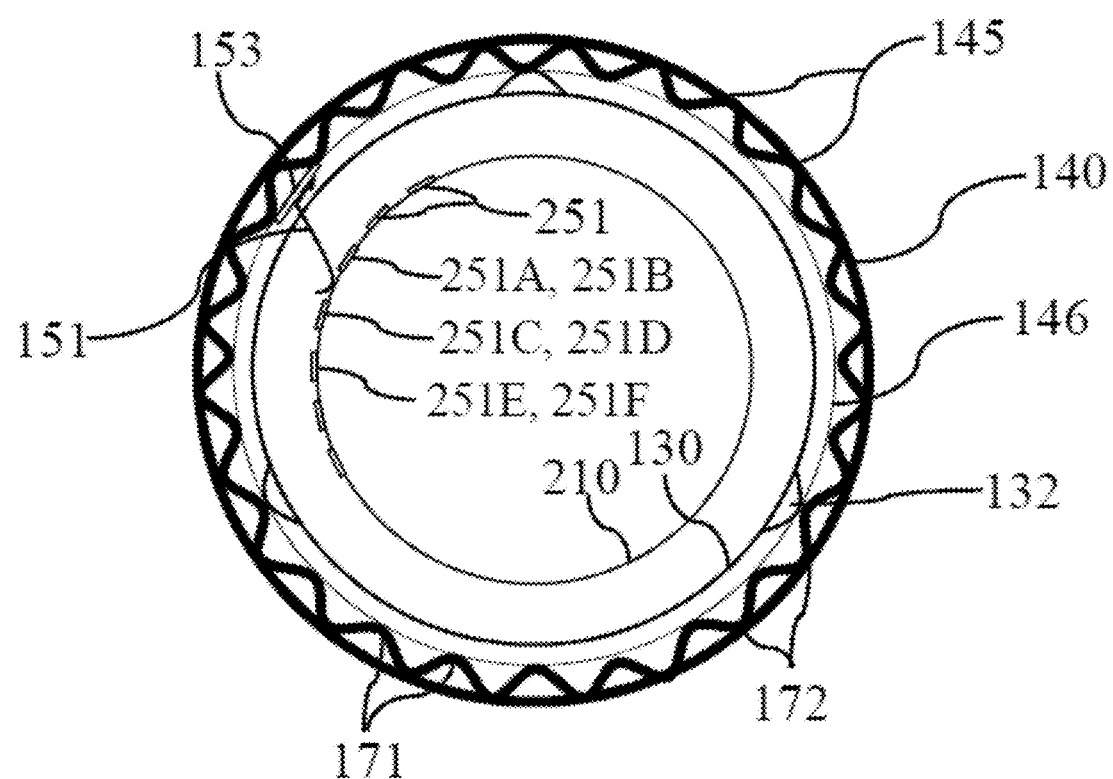
FIG. 9 is another illustrative diagram showing the alternative embodiment of the mode selection assembly of FIG. 8, wherein the selecting ring is turned between two gear positions.

Referring now to FIG. 9, wherein the selecting ring 140 of FIG. 8 is turned. The three bulges 132 are not engaged with the recesses 145, i.e. being out of the valleys 172 of the recesses 145. As shown in FIG. 9, when the selecting ring 140 is turned, the bulges 132 can get out of the recesses 145 and get compressed by the plateaus 171. Because the bulges 132 are spring bulges, the bulges 132 can pass the plateaus 171 and get into respective valleys 172. When the bulges 132 are on the plateaus 171, the selecting ring 140 can be in a non-stable state and the bulges 132 can slip into the respective valleys 172.

Additionally or alternatively, the contact switch 151 can be positioned such that the contact switch 151 does not touch any of the contacts 251 when the bulges 132 are on the plateaus 171. When the bulges 132 slip into the respective valleys 172, an adjacent pair of contacts 251A, 251B can be connected by the contact switch 151. In some other alternative embodiments, the contact switch 151 can connect a selected pair of contacts 251 when the bulges 132 are not in any of the valleys 172, e.g. the contact switch 151 connect the selected pair of contacts 251 when the bulges 132 are on plateaus 171 of the recesses 145.

Although shown and described as only seven pairs of contacts 251 arranged on the outer surface of the lens ring 210 for purposes of illustration only, any suitable number of pairs of contacts 251 can be arranged on the outer surface of the lens ring 210.

Figure 10:
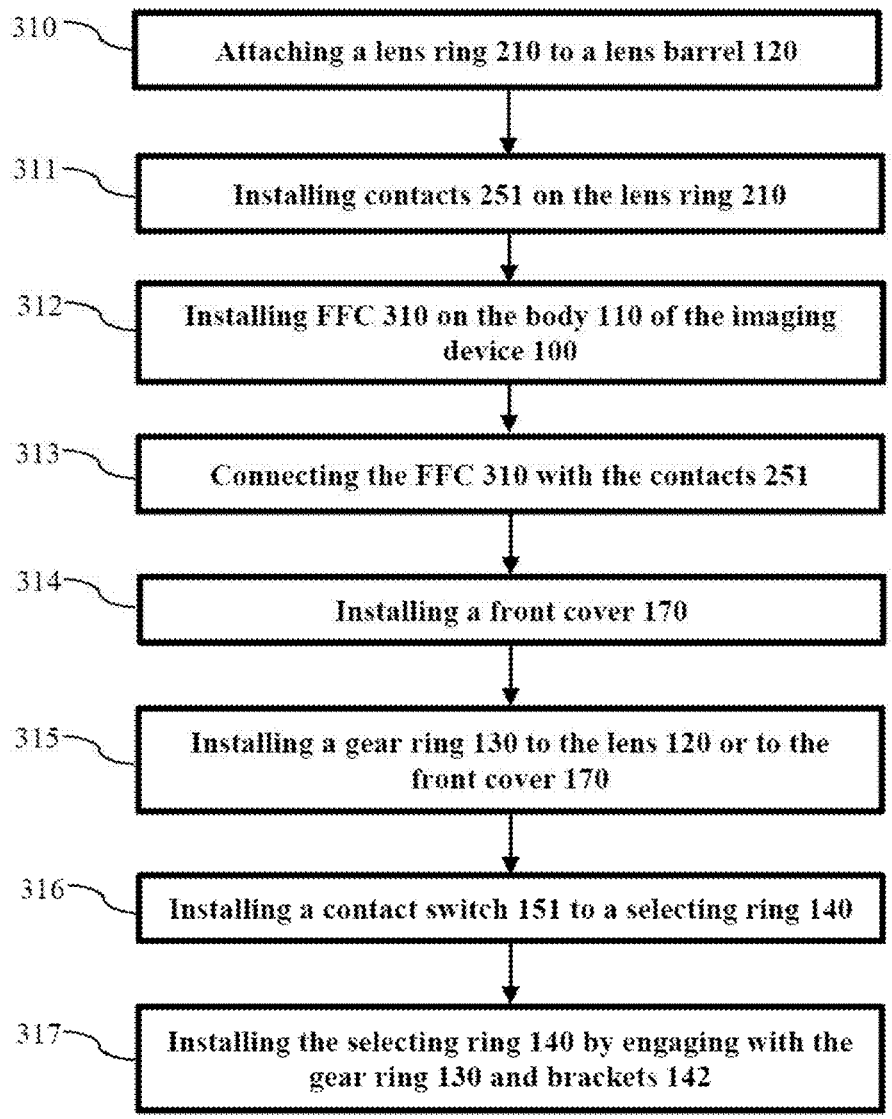
FIG. 10 is an exemplary flow chart illustrating an embodiment of a method for manufacturing the mode selection assembly of FIG. 1.

FIG. 10 illustrates an embodiment of an exemplary method 200 for manufacturing the imaging device 100. In FIG. 10, a lens ring 210 can be attached to a lens barrel 120 of the imaging device 100, at 310. The lens ring 210 can be attached to the lens barrel 120 with screws, studs, bolts or other suitable fasteners. Although shown and described as being attached to the lens barrel 120, the lens ring 210 can be attached and/or fastened to any part of the body 110 (shown in FIG. 11) of the imaging device 100.

Figure 11:
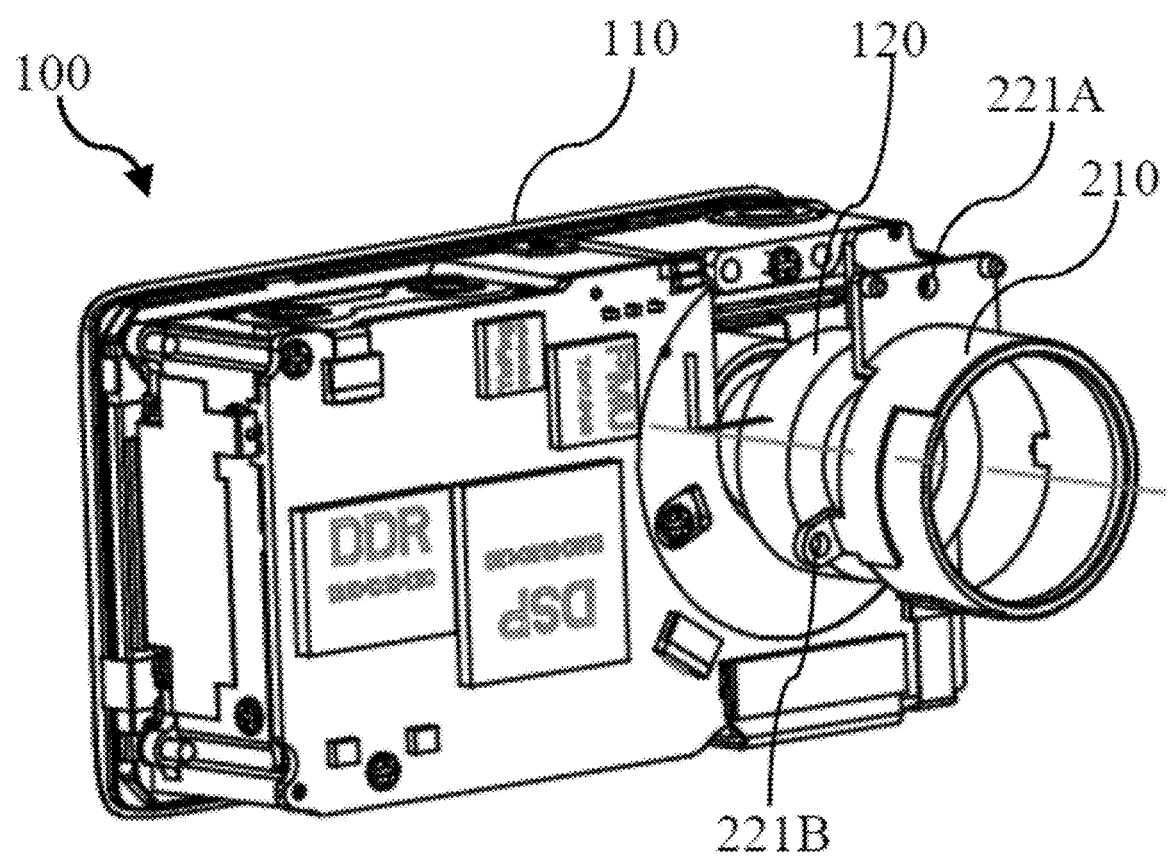
FIG. 11 is an exemplary detail assembly diagram illustrating an embodiment of the lens ring of FIG. 6 being attached to a lens barrel of an imaging device.
Figure 12:
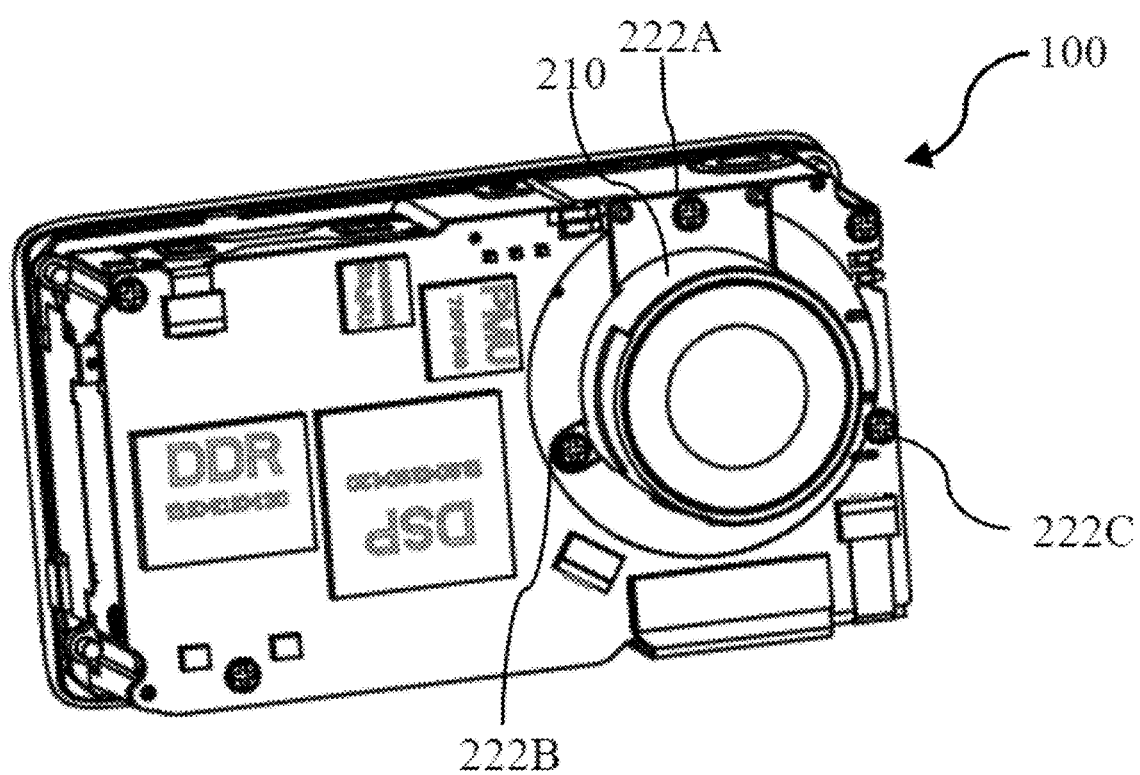
FIG. 12 is another exemplary detail assembly diagram illustrating an embodiment of the lens ring of FIG. 11, wherein the lens ring is installed.

Referring to FIG. 11, the lens ring 210 can be attached to the lens barrel 120. The lens ring 210 can have screw holes 221A, 221B. FIG. 12 illustrates that the lens ring 210 is installed with three screws 222A, 222B, 222C via the screw holes 221A, 221B, 221C of FIG. 11. In some embodiments, when the lens ring 210 is installed, the lens barrel 120 can be sealed by the lens ring 210 against dust or water from getting into the body 110 of the imaging device 100.

Turning back to FIG. 10, a plurality pairs of contacts 251 can be attached to the lens ring 210, at 311, each corresponding an imaging mode. A number of the pairs of the contacts 251 can be more or less than a number of the imaging modes of the imaging device 100. In some embodiments, the number of the pairs can be equal to the number of the imaging modes of the imaging device 100.

At 312, a flexible flat cable ("FFC") 310 can be attached to the body 110 of the imaging device 100. The FFC 310 can contain a plurality of pairs of wires, each being connected to a pair of contacts 251. At 313, the FFC 310 can be connected to a controller of the imaging device 100, such as a digital signal processer ("DSP") 180 (shown in FIG. 13). With the FFC 310, each of the contacts 251 can be conductively connected to the DSP 180.

Figure 13:
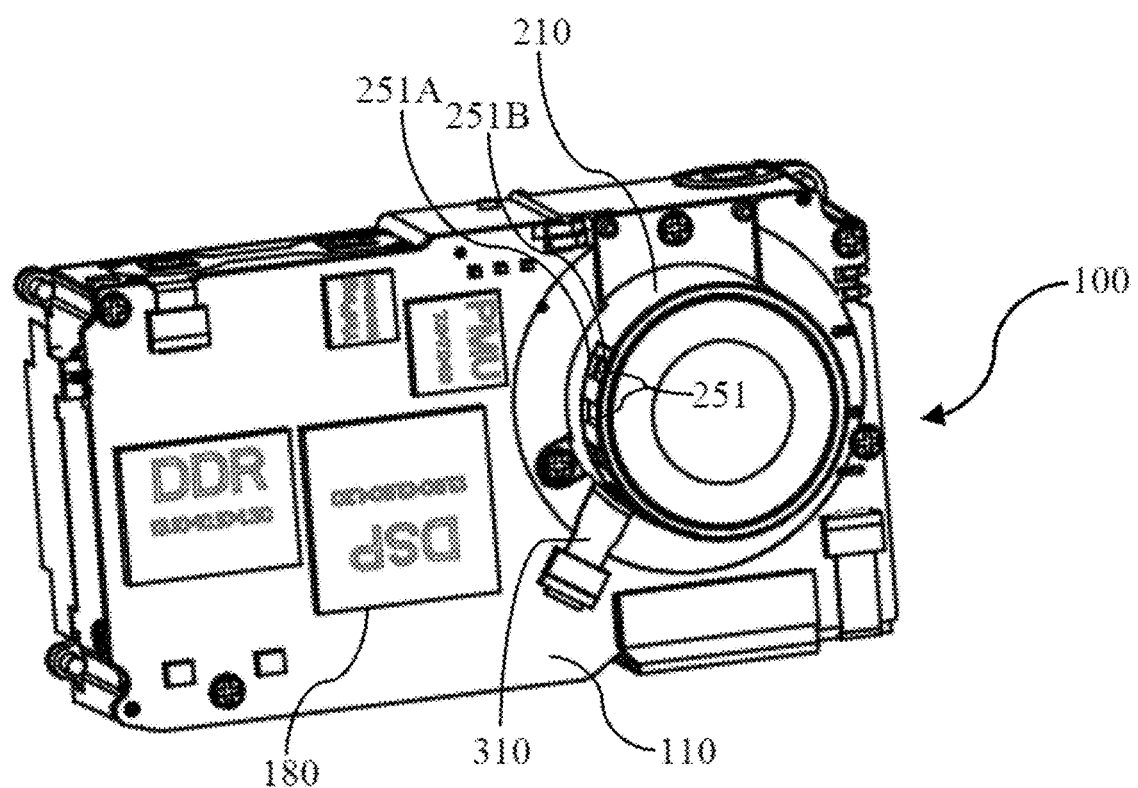
FIG. 13 is another exemplary detail assembly diagram illustrating another embodiment of the assembled lens ring of FIG. 11, wherein a plurality pairs of contacts are attached to the lens ring.

Referring now to FIG. 13, the contacts 251 can be arranged on the lens ring 210 such that each pair of contacts 251A, 251B can be touched by fingers 155 of a contact switch 151 (shown in FIG. 6) when the contact switch 151 is positioned corresponding to a gear position of a selecting ring 140 (shown in FIGS. 8 and 9). The contacts 251 can be attached onto the lens ring 210 by glue, such as hot glue, or by other suitable manners, including, but not limited to, welding or soldering.

Without limitation, the FFC 310 can be attached to the body 110 by glue, such as a 3M® glue. The FFC 310 can also be attached to the body 110 by certain mechanical means, such as clips or other fasteners. The wires of the FFC 310 can be connected to the contacts 251 by soldering, brazing or other suitable methods and can be connected to the DSP 180 via an input interface of the DSP 180. When installed, each pair of the contacts 251 can be connected to the DSP 180 via the FFC 310 for passing a signal when a pair of the contacts 251 is connected.

Figure 14:
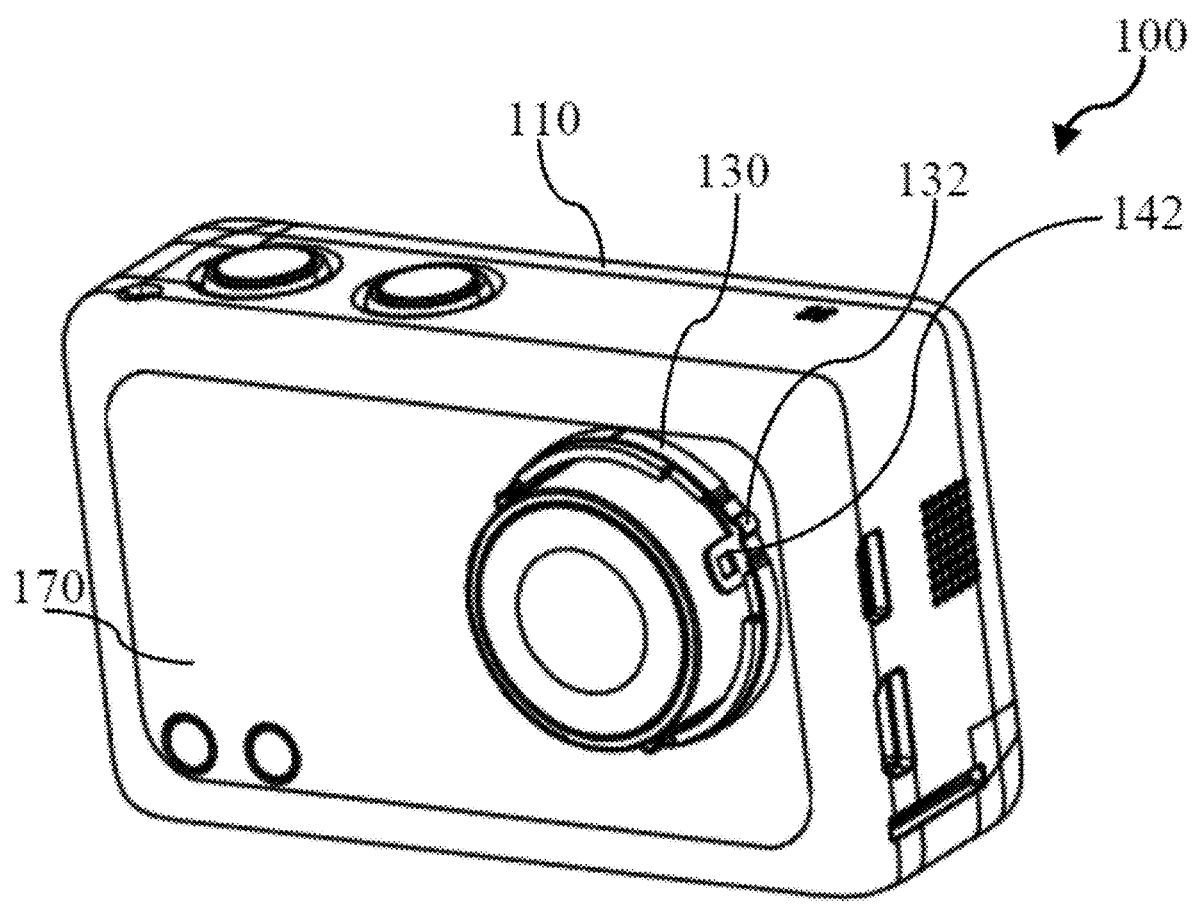
FIG. 14 is an exemplary detail assembly diagram illustrating an embodiment of the gear ring of FIG. 1, wherein the gear ring is attached to a lens ring.

Turning back to FIG. 10, a front cover 170 is attached, at 314, to the body 110 for enclosing the imaging device 100. In some embodiments, the body 110 can be waterproof with the front cover 170 being installed to the body 110. At 315, a gear ring 130 can be attached to the front cover 170 and/or to the lens barrel 120. The gear ring 130 can be extended with a plurality of bulges 132, e.g. spring bulges, for engaging the selecting ring 140. Referring to FIG. 14, two or more bulges 132 can be extended from the gear ring 130. In some embodiments, three or more bulges 132 can be extended from the gear ring 130 for engagement with the selecting ring 140.

Alternatively or additionally, two or more mounting brackets 142 can be associated or extended from the gear ring 130 for engaging the selecting ring 140. In some embodiments, three or more mounting brackets 142 can be extended from the gear ring 130 for engagement with the selecting ring 140.

Referring now to FIG. 14, the front cover 170 can be attached to the body 110 of the imaging device 100 by screws or with other suitable fasteners. The front cover 170 can seal the body 110 as shown in FIG. 14. When the front cover 170 is attached, the gear ring 130 can be attached to the front cover 170 by a buckling mechanism (not shown) or other suitable fastening mechanisms.

As shown in FIG. 14, the gear ring 130 can be extended with the plurality of bulges 132 and the plurality of mounting brackets 142 for engaging the selecting ring 140. The bulges 132 and/or the mounting brackets 142 can be welded or soldered to the gear ring 130. For purposes of illustration but not limitation, the bulges 132 and the brackets 142 can be attached before attaching the gear ring 130 to the front cover 170 and/or the lens barrel 120, at 314.

Turning back to FIG. 10, the contact switch 151 can be attached to the selecting ring 140, at 316. The contact switch 151 can be assembled before the attachment of the contact switch 151 to the selecting ring 140. The contact switch 151 can be attached so that when the selecting ring 140 is at a gear position, the contact switch 151 can engage with a selected pair of the contacts 251.

Figure 15:
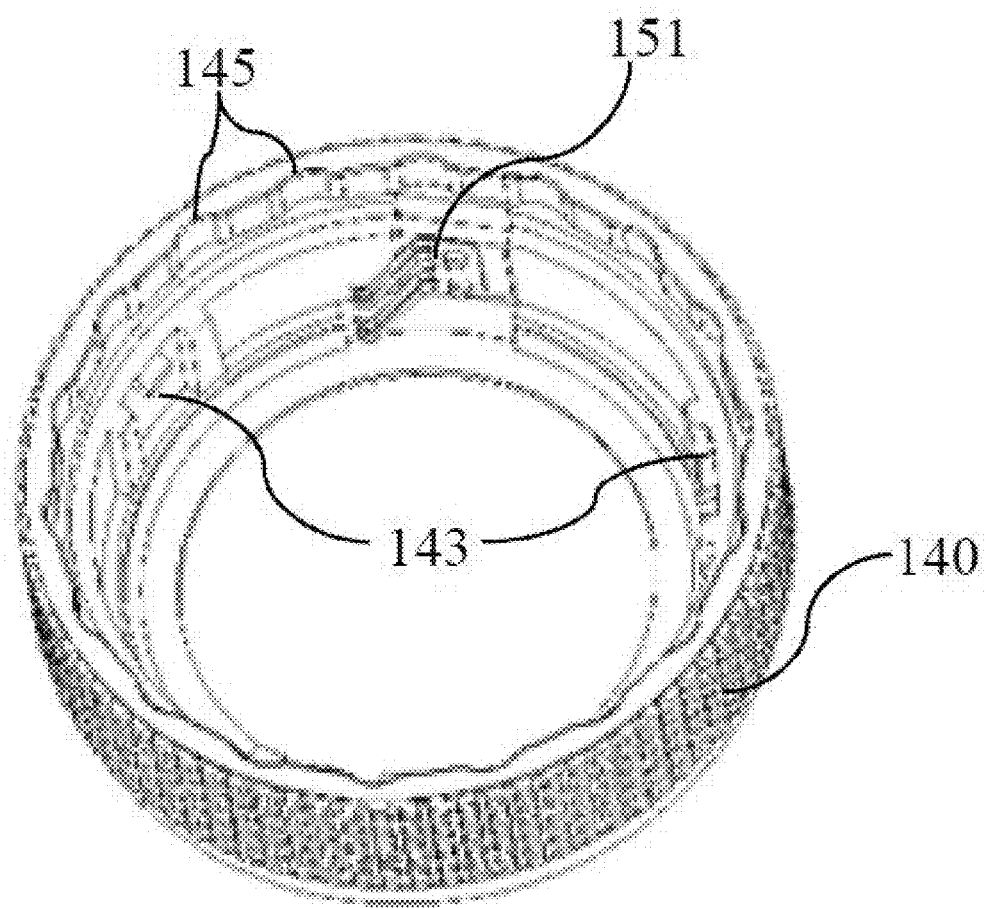
FIG. 15 is an exemplary detail assembly diagram illustrating an embodiment of the selecting ring of FIG. 4, wherein the selecting ring is ready for engaging the gear ring.

The contact switch 151 can be assembled in the manner as shown and described with reference to FIG. 5, by attaching a set of fingers 155, that can be conductively connected, to a base 153 by screws, rivets, glue or other fastening mechanisms. Referring to FIG. 15, the contact switch 151 can be attached to the selecting ring 140 by screws, rivets, glue or other fastening mechanisms.

Turning back to FIG. 10, at 317, the selecting ring 140 can be installed onto the lens barrel 120 by engaging the bulges 132 and the mounting brackets 142 extended from the gear ring 130. Reference to FIG. 15, a plurality of recesses 145 can be provided with the selecting ring 140 for engaging the bulges 132, and a plurality of adapters 143 can be provided for engaging the mounting brackets 142.

The selecting ring 140, shown in FIG. 15, can be installed onto the lens ring 210 by engaging the recesses 145 and the adapters 143 of the selecting ring 140 with the bulges 132 and the mounting brackets 142 of the gear ring 130 respectively to complete the installing of the mode selection assembly 101.

Alternatively or additionally, the installation steps 310-317 can be performed in any order, any combination, individually, and/or optionally.

Figure 16:
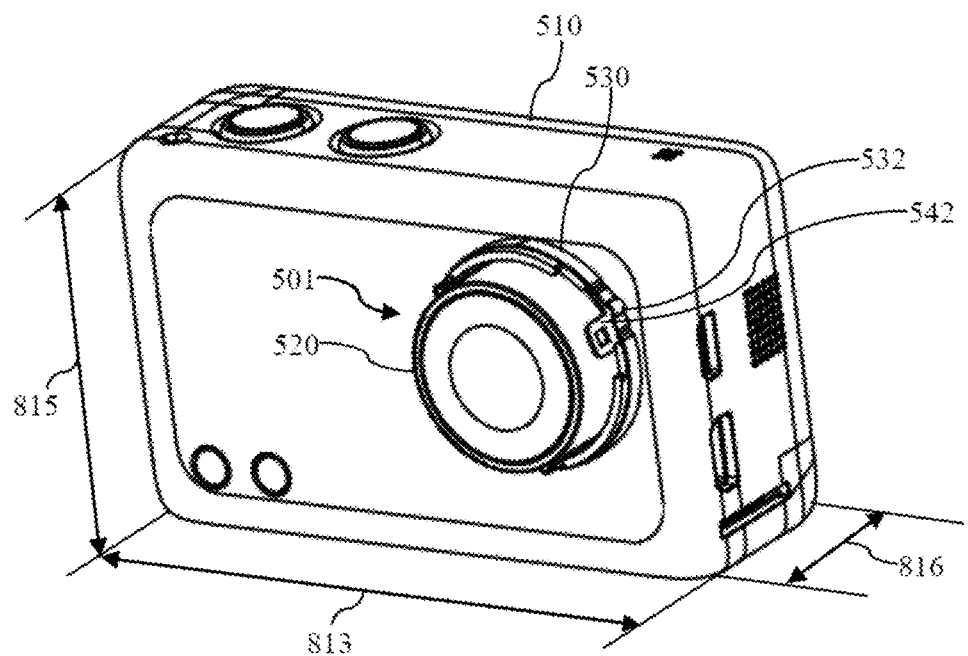
FIG. 16 is another exemplary schematic diagram illustrating an alternative embodiment of the mode selection assembly of FIG. 1, wherein a gear ring is attached to an imaging device.

FIG. 16 illustrates an embodiment of an alternative imaging device 500. As shown in FIG. 16, the mode selection assembly 501 has a gear ring 530. In FIG. 16, the imaging device 100 can comprise a body 510 coupled with a lens barrel 520. The lens barrel 520 can support a lens for capturing images and can be coupled with the mode selection assembly 501. The gear ring 530 can include one or more bulges 532 for engaging a selecting ring 540 (shown in FIG. 18).

Additionally and/or alternatively, the gear ring 530 can include one or more mounting bracket 542 for engaging the selecting ring 540. In some embodiments, a plurality of the mounting brackets 542 can engage the selecting ring 540. The mounting brackets 542 can be extended from a second rotatable ring 531 (shown in FIG. 19) that is part of the selecting ring 540. The mounting brackets 542 can be evenly and/or unevenly distributed around a circumference of the gear ring 530.

Although shown and described as extending from the gear ring 530 for purposes of illustration only, the mounting brackets 542 can extend from other components, such as the lens barrel 520.

In some embodiments, the imaging device 500 can be a compact imaging device, e.g. a compact camera or a sports camera, in a cuboid shape, a cubic shape, a sphere shape, a cylinder shape or a prism shape. In FIG. 16, the imaging device 500 in the cuboid shape can have a front scale measured with a width 813 and a height 815. The front scale, e.g., the width 813 or the height 815, can be between one centimeter and ten centimeters, inclusive, including any value sub-ranges, such as a one centimeter sub-range (e.g., between five centimeters and six centimeters, inclusive), a two centimeter sub-range, a three centimeter sub-range, a four centimeter sub-range, a five centimeter sub-range, a six centimeter sub-range, a seven centimeter sub-range, an eight centimeter sub-range and a nine centimeter sub-range. The front scale of the imaging device 100 can be a square, a rectangle, a round or a polygon shape and can be measured with at least the width 813, the height 815, a diameter, a diagonal (not shown) and the like. The front scale of the imaging device 100 of any of the listed shape can be between one centimeter and ten centimeters, inclusive, including any value sub-ranges, such as a one centimeter sub-range (e.g., between five centimeters and six centimeters, inclusive), a two centimeter sub-range, a three centimeter sub-range, a four centimeter sub-range, a five centimeter sub-range, a six centimeter sub-range, a seven centimeter sub-range, an eight centimeter sub-range and a nine centimeter sub-range.

The imaging device 500 can also have a thickness 816 that can be between one tenth of a centimeter and five centimeters, inclusive, including any value sub-ranges, such as one ninth centimeter sub-range (e.g., between one tenth centimeter and one centimeter, inclusive), a one centimeter sub-range, a two centimeter sub-range, a three centimeter sub-range, a four centimeter sub-range, a five centimeter sub-range. Although shown and described as having the thickness 816 of a cuboid shape for illustrative purposes only, the thickness 816 of the imaging device 500 in any other shape can have a similar measurement between one tenth of a centimeter and five centimeters, inclusive, including any value sub-ranges, such as one ninth centimeter sub-range (e.g., between one tenth centimeter and one centimeter, inclusive), a one centimeter sub-range, a two centimeter sub-range, a three centimeter sub-range, a four centimeter sub-range, a five centimeter sub-range.

Figure 17:
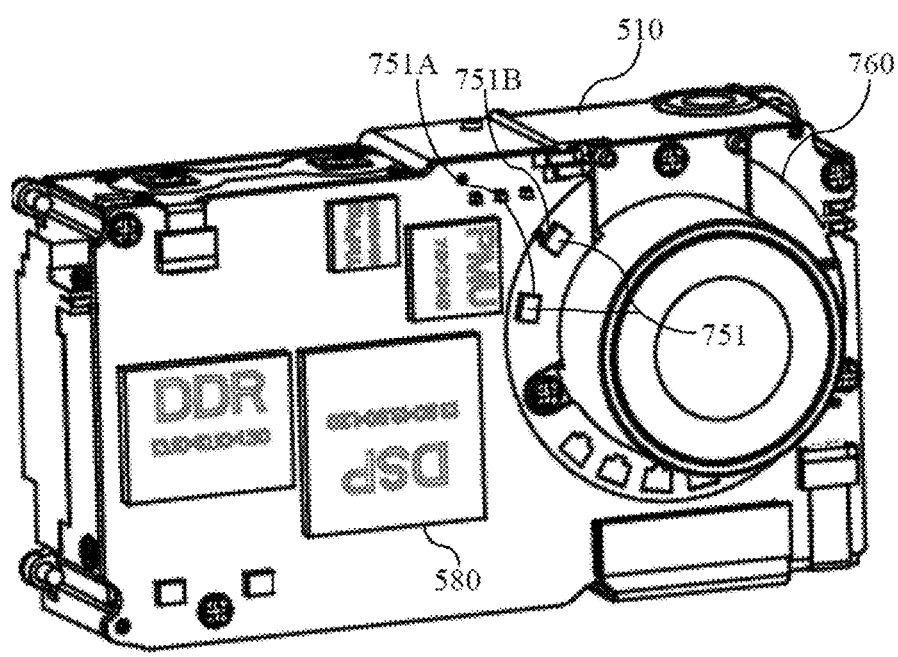
FIG. 17 is an exemplary schematic diagram illustrating an alternative embodiment of the mode selection assembly of FIG. 16, wherein the mode selection assembly has two photoelectric sensors.

FIG. 17 illustrates an embodiment of the mode selection assembly 501 of the imaging device 500. Turning to FIG. 17, the mode selection assembly 501 can include two photoelectric sensors 751 for detecting a change of a current selection. In FIG. 17, the two photoelectric sensors 751 can be attached to a first circular ring 760 that is attached to a body 510 of the imaging device 500. Each of the photoelectric sensors 751 can be connected via a wire to a digital signal processor ("DSP") 580.

When any of the photoelectric sensors 751 is sheltered or exposed, a pulse can be triggered and be sent to the DSP 580. The pulse can include a long pulse, a short pulse, an upward pules or a downward pulse. In some embodiments, an order of the photoelectric sensors 751 being sheltered can be different, signaling a directional user selection. Additional detail regarding the arrangement of the photoelectric sensors 751 will be provided below with reference to FIG. 19.

Although shown and described as triggering the pulse when the photoelectric sensor 751 is sheltered or exposed for purposes of illustration only, the photoelectric sensor 751 can trigger any signal that can indicate the exposure and/or shelter of the photoelectric sensors 751.

Figure 18:
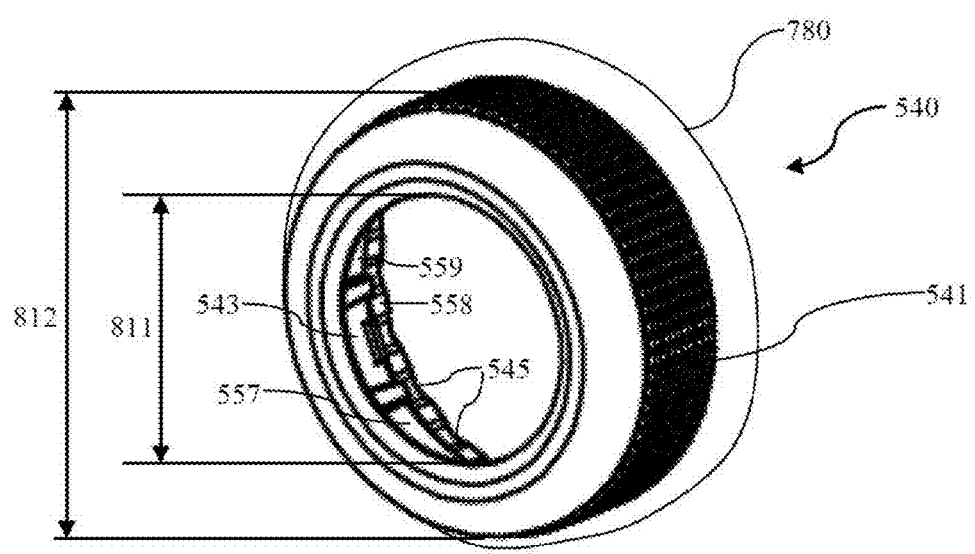
FIG. 18 is an exemplary schematic diagram illustrating an alternative embodiment of a selecting ring of the mode selection assembly of FIG. 17, wherein the selecting ring includes a circular plate.

FIG. 18 illustrates an embodiment of the selecting ring 540 of the mode selection assembly 501. Turning to FIG. 18, the selecting ring 540 can have a ring body 541. The ring body 541 can be in a shape and with a dimension to go around the lens barrel 520 (shown in FIG. 16). The ring body 541 defines an opening for receiving the lens barrel 520. The lens barrel 520 can be at least partially, and/or entirely, received by the opening formed in the ring body 541. The ring body 541 can have an inner surface 557 that can include a first circular section 558 and a second circular section 559.

The first circular section 558 of the ring body 541 can define a plurality of recesses 545 for engaging the bulges 532 of the gear ring 530 (collectively shown in FIG. 16). When being turned, the selecting ring 540 can rotate with the recesses 545, relative to the gear ring 530. Each of the bulges 532 thereby can move from a selected recess 545 to a next recess 545 adjacent to the selected recess 545. In some embodiments, the move the next recess 545 can be indicated via a click sound. In some embodiments, a first number of the bulges 532 can be less than a second number of the recesses 545. The second number of the recesses 545 can be at least three times the first number of the bulges 532. Arrangements and numbers of the bulges 532 and the recesses 545 can ensure smooth rotations of the selecting ring 540 and to provide a user with click signal while operating the selecting ring 540.

The second circular section 559 of the ring body 541 can have a plurality of adapters 543 for engaging the mounting brackets 542 (shown in FIG. 16) extended from the gear ring 530. The adapters 543 can be evenly and/or unevenly distributed around a circumference of the selecting ring 540. A third number of the mounting brackets 542 can be equal to, and/or different from, a fourth number of the adapters 543. An arrangement, shapes and dimensions of the adapters 543 can be constructed to match the mounting brackets 542. The adapters 543 can be matched with the mounting brackets 542 when at least one of the adaptors 543 is engaged with one of the mounting brackets 542. For purposes of illustration but not of limitation, the arrangement of the brackets 542 and the adapters 543 can help to guarantee that two or more of the brackets 542 engage the adapters 543 for a secured engagement.

Figure 19:
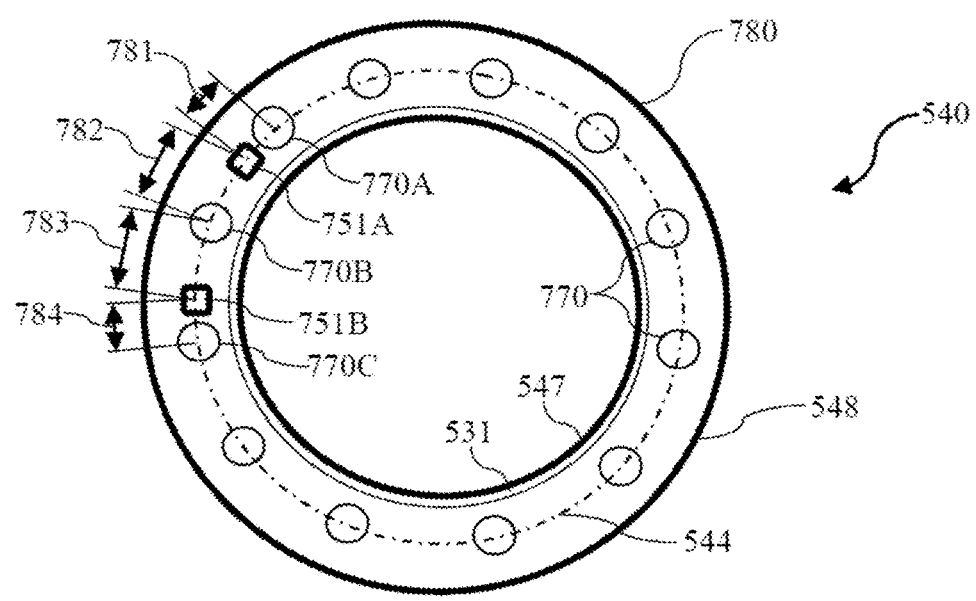
FIG. 19 is an exemplary schematic diagram illustrating an alternative embodiment of the mode selection assembly of FIG. 17, wherein the two photoelectric sensors cooperate with multiple openings on a selecting ring.

As shown FIG. 18, the selecting ring 540 can include an optional circular plate 780 for sheltering and/or exposing two photoelectric sensors 751(shown in FIG. 19). The circular plate 780 can be turned as the selecting ring 540 is turned. When the selecting ring 540 being turned clockwise or counterclockwise, the photoelectric sensors 751 can be sheltered (or blocked) or exposed in particular orders for signaling a change to a current selection. Although shown and described as using two photoelectric sensors 751 for purposes of illustration only, three or more photoelectric sensors 751 can be employed for signaling the user selection.

The selecting ring 540 can have an inner diameter 811 and an outer diameter 812. The inner diameter 811 and the outer diameter 812 can respectively define an inner diameter and an outer diameter of the mode selection assembly 501. In some embodiments, the inner diameter of the mode selection assembly 501 can be between one tenth of a centimeter and ten centimeters, inclusive, including any value sub-ranges, such as a one ninth centimeter sub-range (e.g., between one tenth centimeter and one centimeter, inclusive), a one centimeter sub-range (e.g., between five centimeters and six centimeters, inclusive), a two centimeter sub-range, a three centimeter sub-range, a four centimeter sub-range, a five centimeter sub-range, a six centimeter sub-range, a seven centimeter sub-range, an eight centimeter sub-range and a nine centimeter sub-range. The outer diameter 812 of the mode selection assembly 501 can be between one centimeter and ten centimeters, inclusive, including any value sub-ranges, such as a one centimeter sub-range (e.g., between five centimeters and six centimeters, inclusive), a two centimeter sub-range, a three centimeter sub-range, a four centimeter sub-range, a five centimeter sub-range, a six centimeter sub-range, a seven centimeter sub-range, an eight centimeter sub-range and a nine centimeter sub-range.

In some embodiments, the outer diameter 812 can be less, equal or greater than a front scale, such as the width 813 or the height 815 (collectively shown in FIG. 16), of the imaging device 500. In some exemplary embodiments, the ratio of the outer diameter 812 to the front scale of the imaging device 500 can be between one twentieth to ten, inclusive, including any value sub-ranges, such as a one tenth sub-range (e.g., between one tenth and one fifth, inclusive), a one fifth sub-range, a one fourth sub-range, a half sub-range, a one sub-range, a two sub-range, a three sub-range, a four sub-range, a five sub-range, a six sub-range, a seven sub-range, an eight sub-range and a nine sub-range.

FIG. 19 illustrates another embodiment of the circular plate 780 of the mode selection assembly 501. Turning to FIG. 19, a plurality of openings 770 are provided on the circular plate 780 for detecting a directional rotation of a selecting ring 540. In FIG. 19, the circular plate 780 can be attached to the selecting ring 540 or be an integrated part of the selecting ring 540. The circular plate 780 can shelter the first photoelectric sensor 751A and/or the second photoelectric sensor 751B when the selecting ring 540 is turned. A plurality of round openings 770 can be provided around the circular plate 780 for exposing the photoelectric sensors 751A, 751B.

Although shown and described as square shape for purposes of illustration only, the photoelectric sensors 751A, 751B can be any suitable shapes, including, but not limited to, rectangle, round, oval, triangle, diamond and other polygons. Alternatively or additionally, the openings 770 on the circular plate 780 can be in other shapes, including, but not limited to, rectangle, square, oval, triangle, diamond and other polygons.

One of the photoelectric sensors 751A, 751B can be exposed when any one of the openings 770 is aligned with the photoelectric sensor 751A or 751B. When the selecting ring 540 is turned, the first photoelectric sensor 751A and/or the second photoelectric sensor 751B can be exposed in turn, which triggers an upward pulse, a downward pulse a short pulse or a long pulse.

In FIG. 19, in some embodiments, the openings 770 can be evenly distributed along a circular line 544 between an outer circle 548 and an inner circle 547 of the circular plate 780. A distance between the photoelectric sensors 751A, 751B can be less or greater than a distance between two adjacent openings 770. The photoelectric sensors 751A, 751B can be arranged such that a first distance 781 between the first photoelectric sensor 751A and a first opening 770A can be less than a second distance 782 between the first photoelectric sensor 751A and a second opening 770B. A third distance 783 between the second opening 770B and the second photoelectric sensor 751B can be greater than a fourth distance between the second photoelectric sensor 751B and a third opening 770C. Alternatively or additionally, the first distance 781 can be less than the third distance 783 and the fourth distance 784 and be less than the second distance 782.

Although shown and described as the second opening 770B being in between the first photoelectric sensor 751A and the second photoelectric sensor 751B for purposes of illustration only, there can be zero opening 770 or two or more openings 770 in between the first photoelectric sensor 751A and the second photoelectric sensor 751B. In any embodiments, a distance between the two photoelectric sensors 751 can be different from a distance between any two adjacent openings 770. Additionally or alternatively, none of the two photoelectric sensors 751 can be exposed in an opening 781 when the selecting ring 540 is at a gear position.

When the selecting ring 540 is turned counterclockwise, the circular plate 780 can also be turned counterclockwise. The first opening 770A can go in a direction of the first photoelectric sensor 751A and second opening 770B can go in a direction of the second photoelectric sensor 751B. Because the first distance 781 can be less than the third distance 783, the first photoelectric sensor 751A can be exposed before the second photoelectric sensor 751B can be exposed. A signal pulse can be triggered and passed to a DSP 580 (shown in FIG. 17). The DSP 580 can select an item direct above the current selection of an imaging mode menu or an item direct below the current selection of the imaging mode menu.

Alternatively and/or additionally, the DSP 580 can select an item that is two or more items above the current selection or an item two or more items below the current selection when the selection ring 540 is turned counterclockwise by two or more gear positions continuously.

When the selecting ring 540 is turned clockwise, the circular plate 780 can also be turned clockwise. The second opening 770B can go in a direction of the first photoelectric sensor 751A and third opening 770B can go in a direction of the second photoelectric sensor 751B. Because the fourth distance 784 can be less than the second distance 782, the second photoelectric sensor 751B can be exposed before the first photoelectric sensor 751A can be exposed. A signal pules can be triggered and passed to the DSP 580. The DSP 580 can select the item direct below the current selection of the imaging mode menu or the item direct above the current selection of the imaging mode menu.

Alternatively and/or additionally, the DSP 580 can select an item that is two or more items below the current selection or an item two or more items above the current selection when the selection ring 540 is turned clockwise by two or more gear positions continuously.

In some embodiments, a fifth distance between two adjacent recesses 545 can match a sixth distance between any two adjacent openings 770, i.e. a gear distance of the selecting ring 540 match the sixth distance between the two adjacent openings 770. Therefore, any rotation of the selecting ring 540 can result in that each of the photoelectric sensors 751 is in a same position relative to the openings 770 adjacent to the photoelectric sensor 751.

Figure 20:
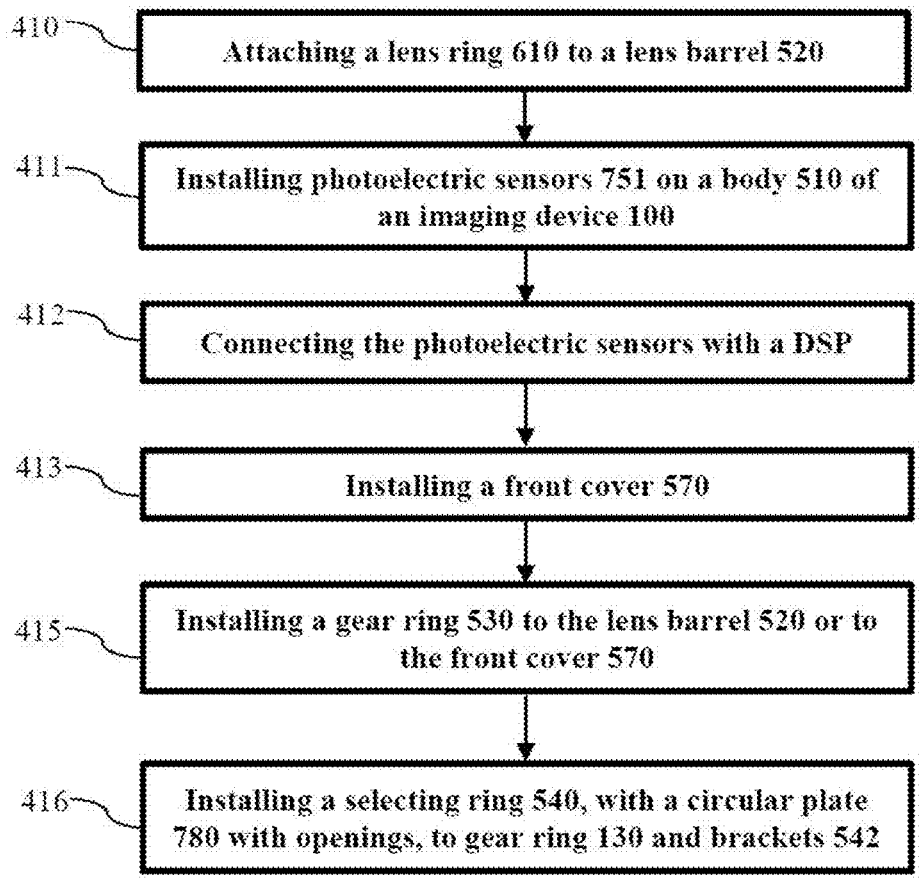
FIG. 20 is an exemplary flow chart illustrating an alternative embodiment of the method for manufacturing the mode selection assembly of FIG. 16.

FIG. 20 illustrates an embodiment of an exemplary method 400 for manufacturing an imaging device 500 with the mode selection assembly 501. Turning to FIG. 20, the method 400 includes attaching a lens ring 610, a gear ring 530 and a selecting ring 540 to the imaging device 500. In FIG. 20, a lens ring 610 can be attached to a lens barrel 520, at 410. The lens ring 610 can be attached to the lens barrel 520 with screws, studs, bolts or other suitable fasteners. Although shown and described as being attached to the lens barrel 520, the lens ring 610 can be attached and/or fastened to any part of the body 510 (shown in FIG. 21) of the imaging device 500.

Figure 21:
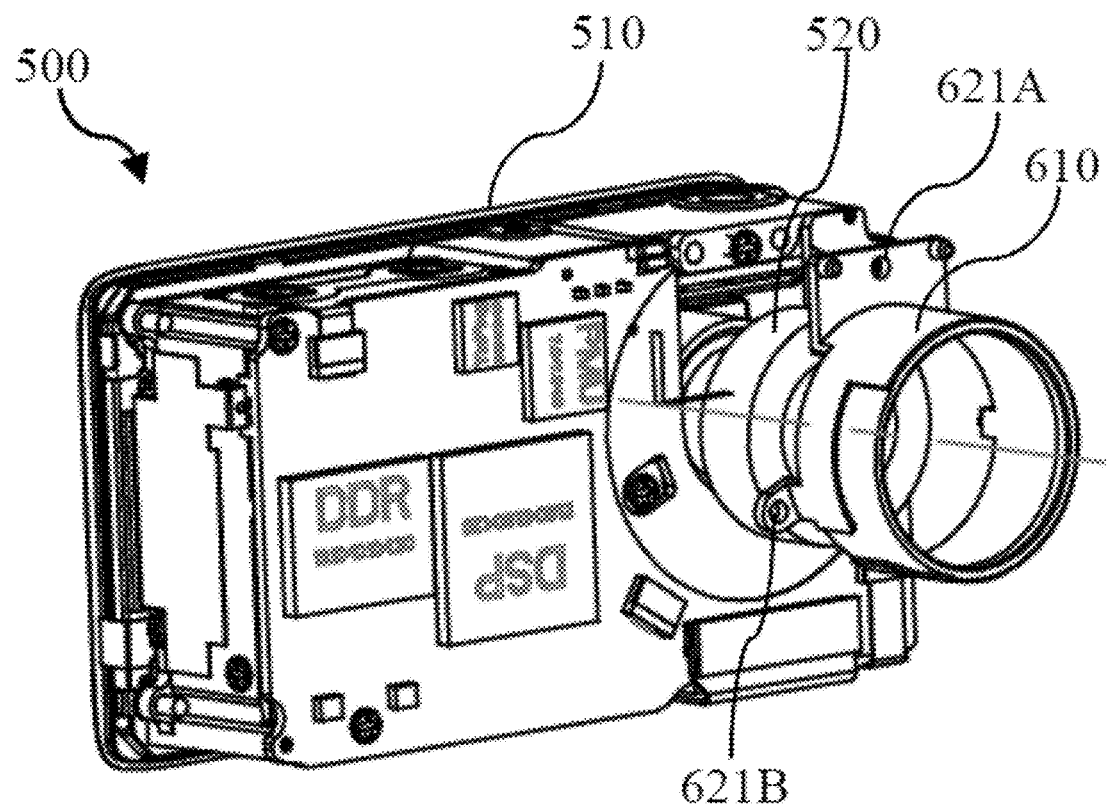
FIG. 21 is an exemplary detail assembly diagram illustrating an embodiment of the lens ring of FIG. 17 being attached to a lens barrel of an imaging device.
Figure 22:
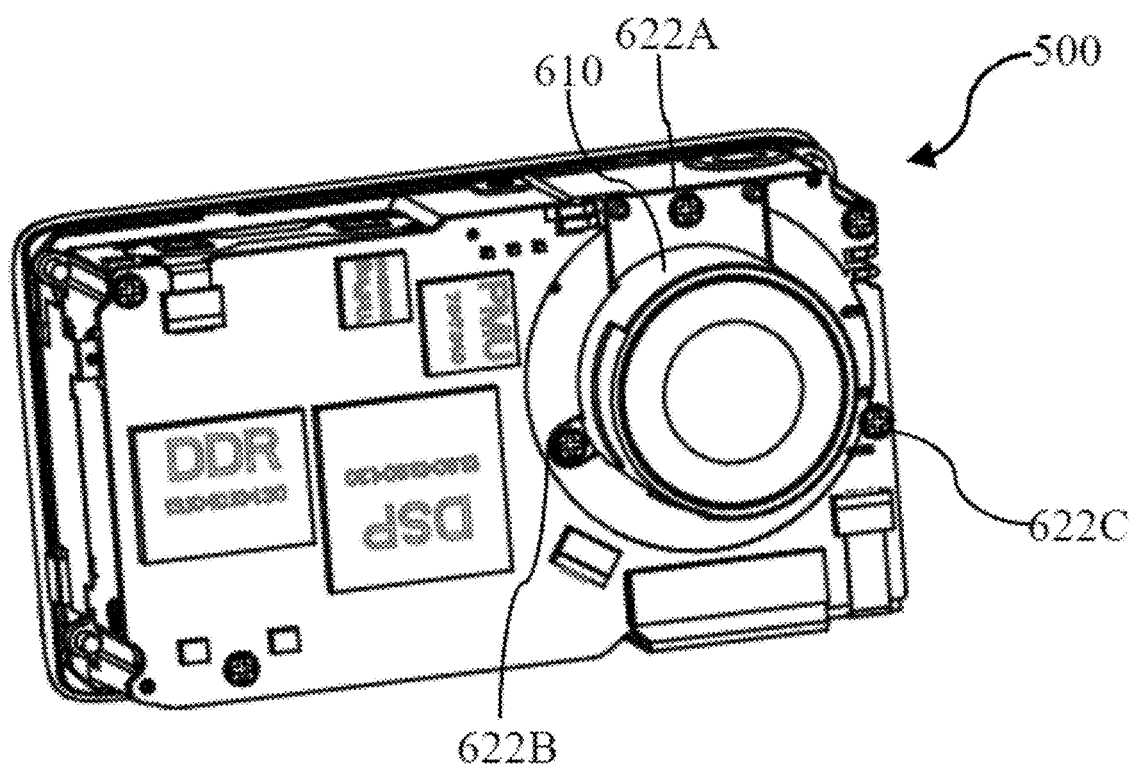
FIG. 22 is another exemplary detail assembly diagram illustrating an embodiment of the lens ring of FIG. 21, wherein the lens ring is installed.

Referring to FIG. 21, the lens ring 610 can be attached to the lens barrel 520. The lens ring 610 can include screw holes 621A, 621B. FIG. 22 illustrates that the lens ring 610 is installed with three screws 622A, 622B, 622C via the screw holes 621A, 621B, 621C (not shown). In some embodiments, when the lens ring 610 is installed, the lens barrel 520 can be seal by the lens ring 610 against dust or water from getting into the body 510 of the imaging device 500.

Turning back to FIG. 20, a pair of photoelectric sensors 751 can be attached to a portion of the lens ring 610, at 411. In some embodiments, the photoelectric sensors 751 can be connected, at 412, to a controller, such as a digital signal processor ("DSP") 580 (shown in FIG. 17).

Referring back to FIG. 19, the photoelectric sensors 751 can be arranged on the lens ring 610 such that the distance of the photoelectric sensors 751 can be less or greater than a distance between two openings 770 provided on a circular plate 780. The photoelectric sensors 751 can be attached onto the lens ring 610 by glue, such as hot glue, or by other suitable manners, including, but not limited to, buckling, welding or soldering.

Figure 23:
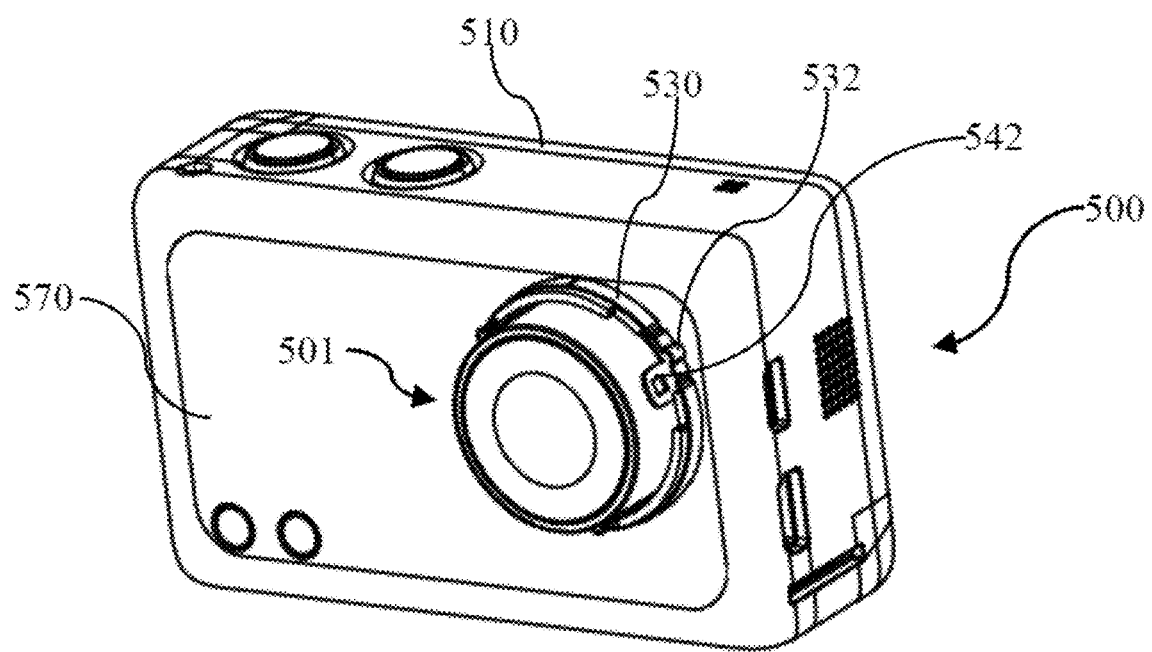
FIG. 23 is another exemplary detail assembly diagram illustrating another embodiment of the lens ring of FIG. 16, wherein a gear ring is attached to a lens ring.

Turning back to FIG. 20, a front cover 570 is installed, at 413, for enclosing the imaging device 500, as shown in FIG. 23. In some embodiments, the body 510 can be waterproofed with the front cover 570 installed to the body 510.

Two openings (not shown) corresponding to the positions of the photoelectric sensors 751 can be provided to expose the photoelectric sensors 751.

At 415, a gear ring 530 can be attached to the front cover 570 and/or the lens barrel 520. The gear ring 530 can be extended with a plurality of bulges 532 for engaging a selecting ring 540 (shown in FIG. 18). In FIG. 23, for engaging the selecting ring 540, two or more bulges 532 can be extended from the gear ring 530. In some embodiments, three or more bulges 532 can be extended from the gear ring 530 for optimal engagement with the selecting ring 540.

Alternatively or additionally, two or more mounting brackets 542 can be associated or extended from the gear ring 530 for engaging the selecting ring 540. In some embodiments, three or more mounting brackets 542 can be extended from the gear ring 530 for better engagement with the selecting ring 540.

Referring now to FIG. 23, the front cover 570 can be attached to the body 510 of the imaging device 500 by screws or other suitable fasteners. The front cover 570 can seal the body 510 as shown in FIG. 23. When the front cover 570 is attached, the gear ring 530 can be attached to the front cover 570 by a buckling mechanism (not shown) or other suitable fastening mechanisms. The openings for exposing the photoelectric sensors 751 can be provided before the front cover 570 is attached.

As shown in FIG. 23, the gear ring 530 can be extended with the plurality of bulges 532 and the plurality of mounting brackets 542 for engaging the selecting ring 540. The bulges 532 and/or the mounting brackets 542 can be welded or soldered to the gear ring 530. For purposes of illustration but not limitation, the bulges 532 and the mounting brackets 542 can be attached from before attaching the gear ring 530 to the front cover 570 and/or the lens barrel 520.

Turning back to FIG. 20, at 416, the selecting ring 540 can be installed onto the lens barrel 520 by engaging the gear ring 530 and the brackets 542. Before the installation, a circular plate 780, as shown and described with reference to FIGS. 18 and 19, can be attached to the selecting ring 540. Referring to FIG. 19, the circular plate 780 can be provided with a plurality of openings 770 that can be evenly distributed along a circular line 544 between an outer circle 548 and an inner circle 547. The plurality of openings 770 can be provided in the manner shown and described with reference to FIG. 19. The circular plate 780 can be attached to the selecting ring 540 by soldering, welding or any suitable fastening manners. Alternative or additionally, the circular plate 780 can be an integrated component, e.g. a component molded with plastic material or metallic material.

At 416, the selecting ring 540 can be installed onto the gear ring 530 by engaging a plurality of recesses 545 and the adapters 543 of the selecting ring 540 with the bulges 532 and the mounting brackets 542 of the gear ring 530 respectively to complete the installing of the mode selection assembly 501 and the imaging device 500 (collectively shown in FIG. 17).

Alternatively or additionally, the installation steps 410-416 can be performed in any order, any combination, individually, and/or optionally.

Figure 24:
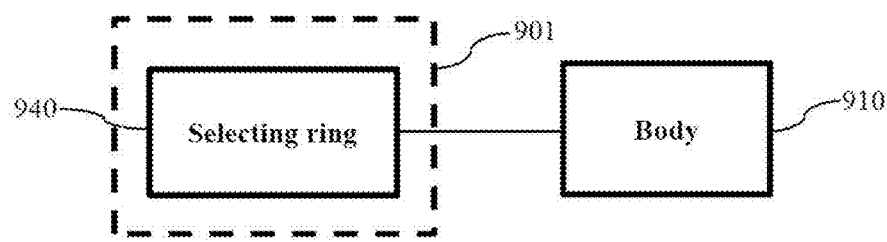
FIG. 24 is another exemplary top-level block diagram illustrating an alternative embodiment of a mode selection assembly for selecting an imaging mode, wherein the mode selection assembly includes a selecting ring.

FIG. 24 illustrates another embodiment of a mode selection assembly 901. The mode selection assembly 901 can be coupled with an imaging device 900 and be utilized for switching from among various imaging modes of the imagine device 900. As shown in FIG. 24, the mode selection assembly 901 can comprise a selecting ring 940 being coupled with a body 910 of the imaging device 900.

The selecting ring 940 can have a plurality of gear positions (not shown) and can be turned among the gear positions. The imaging device 900 can have a plurality of imaging modes, e.g. single shot mode, burst mode, protune mode, timelapse photo mode, time video mode, night photo mode etc. In some embodiments, either each of the imaging modes can correspond to a desired gear position or each turn of the selecting ring 940 can trigger a desired change of a current selection of the imaging mode. When the selecting ring 940 is turned, a signal can be triggered and sent to a controller of the imaging device 900.

In some embodiments, the controller can select or switch the desired imaging mode according to a signal reflecting a new gear position of the selecting ring 940. The controller can select a corresponding imaging mode when the selecting ring 940 is turned to the gear position. Stated differently, each of the imaging modes corresponds to a selected gear position.

In some other embodiments, the turn of the selecting ring 940 can trigger a signal that indicates a change to the imaging mode of the imaging device 900. In such embodiments, when the user turns the selecting ring 940, a directional change signal can be triggered and sent to the controller. The controller can select an imaging mode based upon the directional change signal, a current selection and an imaging mode menu of the imaging device 100.

In some other embodiments, the signal triggered can reflect a directional turn of the selecting ring 940. When the selecting ring 940 is turned clockwise, a first signal can be transferred to the controller. When the selecting ring 940 is turned counterclockwise, a second signal can be transferred to the controller, being different from the first signal. The directional signal triggered can cause an imaging mode change in accordance with a preset rule, e.g., the controller can select an item direct above the current selection of an imaging mode menu or an item direct below the current selection of an imaging mode menu. In some other embodiments, the image mode change can reflect a number of gear position changes. Stated somewhat differently, when the selecting ring 940 is turned by two or more gear positions, the controller can select an item with two or more positions above or below the current selection of the imaging mode menu respectively.

In some alternative embodiments, for purposes of detecting the directional turn of the selecting ring 940, a plurality pairs of contacts 251 (or contact pairs) can be provided as shown and described above with reference to FIG. 8. Each pair of contacts 251 can generate the mode selection signal when the pair of contacts 251 is connected with a conductive path, which mode selection signal can correspond to an imaging mode. In an exemplary embodiment, the conductive path can be provided with a contact switch for connecting the selected pair of contacts 251. A corresponding mode selection signal can be generated when the selected pair of contacts 251 is connected by the contact switch in a manner as shown and described herein.

In some other embodiments, for purposes of detecting the directional turn of the selecting ring 940, two or more photoelectric sensors 751 can be provided as shown and described above with reference to FIG. 19. The two photoelectric sensors 751 can be sheltered when the selecting ring 940 is in any of the gear positions and can generate the mode selection signal when at least one selected photoelectric sensor 751 is exposed. The selected photoelectric sensor 751 can be exposed by turning the selecting ring 940. In some embodiments, both of the two photoelectric sensors 751 can be exposed in a change of one gear position, and the two photoelectric sensors 751 can be exposed in a different order, when the selecting ring 940 is turned, in a manner shown and described as shown and described herein.

Although shown and described as using the pairs of contacts 251 and the two photoelectric sensors 751 for detecting the turns of the selecting ring 940 for purposes of illustration only, any other suitable manners can be used for generating the mode selection signals, e.g., using one contact or one photoelectric sensor 751.

In some alternative embodiments, the mode selection signal can trigger an imaging operation of the imaging device 900. The imaging operation of the imaging device 900 can include an operation of capturing one or more pictures with the selected imaging mode. In an exemplary example, when a single shot mode is selected, the mode selection signal can trigger an operation of capturing one picture. When a video mode is selected, the mode selection signal can trigger an operation of capturing a plurality of pictures, e.g., continuous pictures or a video clip.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A mode selection assembly comprising:
    a gear ring coupled to a lens barrel of an imaging device having two or more gear positions, the gear ring being configured to be a sleeve of the lens barrel;
    a selecting ring coupled to the lens barrel and configured to adjust an imaging mode of the imaging device by turning the selecting ring; and
    two or more photoelectric sensors; wherein:
    the selecting ring comprises:
        a first circular section having a plurality of recesses configured to engage with a first number of bulges of the gear ring; and
    the two or more photoelectric sensors are attached to the first circular section.

2. The mode selection assembly according to claim 1, wherein a quantity of the first number of bulges is smaller than a quantity of the plurality of recesses, and the quantity of the plurality of recesses is at least three times the quantity of the first number of bulges.

3. The mode selection assembly according to claim 1, wherein the selecting ring further comprises:
    a second circular section having a second number of adapters configured to match with a third number of mounting brackets extended from the gear ring, wherein the second number of adapters are distributed around a circumference of the selecting ring.

4. The mode selection assembly according to claim 1, wherein the selecting ring further comprises:
    a switch at least partially integrated with the selecting ring and configured to connect with one or more pair of contacts,
        wherein the switch rotates with the selecting ring to connect with a pair of corresponding contacts.

5. The mode selection assembly according to claim 3, wherein:
    the gear ring includes an outer ring and an inner ring rotatably engaged with each other, wherein:
        the outer ring stays stationary during a rotation of the inner ring; and
        the third number of bulges are extended from the outer ring.

6. The mode selection assembly according to claim 4, where the switch includes a plurality of fingers configured to contact the one or more pair of contacts to form an electrically conductive path such that electric current flows between the plurality of fingers and the one or more pair of contacts.

7. The mode selection assembly according to claim 1, wherein the selecting ring comprises:
    a ring body configured to receive the lens barrel through an opening formed in the ring body.

8. The mode selection assembly according to claim 4, wherein each of the two or more photoelectric sensors is configured to trigger a signal indicating an exposure or a block of the photoelectric sensor.

9. The mode selection assembly according to claim 8, wherein a sequence of the exposure or the block of the photoelectric sensor indicates a change of the imaging mode during a rotation of the selecting ring.

10. The mode selection assembly according to claim 8, wherein the selecting ring further comprises a circular plate configured to expose or block the two or more photoelectric sensors.

11. The mode selection assembly according to claim 10, wherein the circular plate includes a plurality of openings configured to expose the two or more photoelectric sensors.

12. The mode selection assembly according to claim 11, wherein:
    when a distance between two adjacent photoelectric sensors is different from a distance between two adjacent openings, the two adjacent photoelectric sensors are exposed or blocked in different sequences.

13. The mode selection assembly according to claim 11, wherein the circular plate rotates in a same direction with the selecting ring.

14. The mode selection assembly according to claim 11, wherein:
    when a distance between two adjacent recesses equals a distance between two adjacent openings, during a rotation of the selecting ring, each of the two or more photoelectric sensors is located at a same position with respect to corresponding adjacent openings.

15. The mode selection assembly according to claim 14, wherein the two or more photoelectric sensors are exposed or blocked simultaneously.

16. The mode selection assembly according to claim 12, wherein:
    a mode selection signal is generated when one or more photoelectric sensors are selected and at least one selected photoelectric sensor is exposed, wherein the at least one selected photoelectric sensor is selected by selecting a pair of contacts for connecting with the switch.

17. The mode selection assembly according to according to claim 16, wherein the mode selection signal corresponds to an imaging mode.

18. The mode selection assembly according to claim 16, wherein the mode selection signal triggers an imaging operation of the imaging device, wherein the imaging operation includes capturing a picture in a corresponding imaging mode.

* * * * *